United States Patent
Lei et al.

(10) Patent No.: US 11,564,253 B2
(45) Date of Patent: Jan. 24, 2023

(54) MESSAGE CONFIGURATION FOR TWO STEP RANDOM ACCESS PROCEDURE

(71) Applicant: QUALCOMM Incorporated, San Diego, CA (US)

(72) Inventors: Jing Lei, San Diego, CA (US); Wanshi Chen, San Diego, CA (US); Linhai He, San Diego, CA (US); Hung Dinh Ly, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/023,840

(22) Filed: Sep. 17, 2020

(65) Prior Publication Data
US 2021/0084680 A1    Mar. 18, 2021

Related U.S. Application Data

(60) Provisional application No. 62/902,230, filed on Sep. 18, 2019.

(51) Int. Cl.
*H04W 74/00*    (2009.01)
*H04W 56/00*    (2009.01)
(Continued)

(52) U.S. Cl.
CPC ......... *H04W 74/008* (2013.01); *H04L 1/0003* (2013.01); *H04L 5/0051* (2013.01);
(Continued)

(58) Field of Classification Search
CPC ........... H04W 74/008; H04W 74/0833; H04W 76/11; H04W 76/27; H04W 56/001; H04L 1/0003; H04L 5/0051; H04L 5/10
(Continued)

(56) References Cited

U.S. PATENT DOCUMENTS

2019/0320467 A1* 10/2019 Freda ................ H04W 74/0833
2020/0107369 A1* 4/2020 Jeon .................... H04W 56/005
(Continued)

FOREIGN PATENT DOCUMENTS

WO    WO-2020124380 A1    6/2020
WO    WO-2020154169 A1    7/2020

OTHER PUBLICATIONS

Huawei et al.,"Discussion on the MSGA Resource Configuration", 3GPP TSG-RAN WG2 # 105bis, R2-1904111 Discussion on the MSGA Resource Configuration, 3rd Generation Partnership Project (3GPP), Mobile Competence Centre, 650, Route Des Lucioles, F-06921 Sophia-Antipolis Cedex, F, vol. RAN WG2, No. Xi 'an, China, Apr. 8, 2019-Apr. 12, 2019 Apr. 6, 2019 (Apr. 6, 2019), XP051701425, pp. 1-4, Retrieved from the Internet: URL:http://www.3gpp.org/ftp/Meetings%5F3GPP%5FSYNC/RAN2/Docs/R2%2D1904111%2Ezip[retrieved on Apr. 6, 2019] section 2.1, pp. 1-2.
(Continued)

*Primary Examiner* — Candal Elpenord
(74) *Attorney, Agent, or Firm* — Holland & Hart LLP/Qualcomm Incorporated

(57) ABSTRACT

Methods, systems, and devices for wireless communications are described that relate to a two-step random access procedure. Generally, the described techniques allow different configurations for a first message of a random access procedure depending on a connected-state of the user equipment (UE) performing the random access procedure. A base station may transmit configuration information to the UE and the UE may use the configuration information to determine resources, coding, block size, or other factors for transmitting the first message based on the radio resource control (RRC) connected state of the UE. The UE may then monitor for a random access response from the base station based on the first message from the UE.

30 Claims, 15 Drawing Sheets

(51) Int. Cl.
    *H04W 74/08*     (2009.01)
    *H04L 5/10*     (2006.01)
    *H04L 1/00*     (2006.01)
    *H04W 76/27*     (2018.01)
    *H04W 76/11*     (2018.01)
    *H04L 5/00*     (2006.01)

(52) U.S. Cl.
    CPC ............. *H04L 5/10* (2013.01); *H04W 56/001* (2013.01); *H04W 74/0833* (2013.01); *H04W 76/11* (2018.02); *H04W 76/27* (2018.02)

(58) Field of Classification Search
    USPC .................................................. 370/329–330
    See application file for complete search history.

(56) References Cited

U.S. PATENT DOCUMENTS

2021/0051736 A1*   2/2021   Jeon ....................... H04W 76/18
2022/0007427 A1*   1/2022   Fujishiro ............... H04W 48/16

OTHER PUBLICATIONS

International Search Report and Written Opinion—PCT/US2020/051512—ISA/EPO—dated Nov. 17, 2020.
OPPO: On Channel Structure for 2-Step RACW', 3GPP Draft, 3GPP TSG RAN WG1 #98, R1-1909222, 3rd Generation Partnership Project (3GPP), Mobile Competence Centre, 650, Route Des Lucioles, F-06921 Sophia-Anti Polis Cedex, France, vol. RAN WG1, No. Prague, Czech, Aug. 26, 2019-Aug. 30, 2019 Aug. 17, 2019 (Aug. 17, 2019), XP051765827, 14 Pages, Retrieved from the Internet: URL:http://www.3gpp.org/ftp/tsg_ran/WG1_RL1/TSGR1_98/Docs/R1-1909222.zip [retrieved on Aug. 17, 2019] section 2, pp. 1-2 section 2.4, p. 7.

* cited by examiner

MESSAGE CONFIGURATION FOR TWO STEP RANDOM ACCESS PROCEDURE

CROSS REFERENCE

The present Application for Patent claims the benefit of U.S. Provisional Patent Application No. 62/902,230 by LEI et al., entitled "MESSAGE CONFIGURATION FOR TWO STEP RANDOM ACCESS PROCEDURE," filed Sep. 18, 2019, assigned to the assignee hereof, and expressly incorporated by reference herein.

FIELD OF TECHNOLOGY

The following relates generally to wireless communications and more specifically to message configuration for two-step random access procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station using a two-step random access procedure. The two-step random access procedure may decrease signaling overhead and increase efficiency. The traffic pattern and payload size of random access transmissions may vary depending on the state of the network, the messages being transmitted, or other factors, which may lead to inefficient resource utilization, limited signaling flexibility, or both.

SUMMARY

The described techniques relate to improved methods, systems, devices, and apparatuses that support message configuration for two-step random access procedure. Generally, the described techniques allow multiple configurations for transmission of the first message (e.g., MsgA) of a two-step random access procedure between a base station and a user equipment (UE). For example, a base station may transmit configuration information for a first message of the two-step random access procedure to the UE, where the configuration information depends on the connected-state of the UE (e.g., idle connected-state, inactive connected-state, or a connected-state). The UE may use the configuration information to transmit the first message based on the radio resource control (RRC) state of the UE as part of the two-step random access procedure. The UE may then monitor for a random access response message from the base station in response to the first message from the UE.

A method of wireless communications at a UE is described. The method may include receiving, from a base station, configuration information for a first message of a two-step random access procedure between the UE and the base station, the configuration information including a connection-state dependent element indicating that the configuration information corresponds to a connection-state of the UE, transmitting, to the base station and based on a current connection-state of the UE being the connection-state of the UE to which the configuration information corresponds, the first message of the two-step random access procedure, and monitoring for a second message of the two-step random access procedure from the base station in response to the first message.

An apparatus for wireless communications at a UE is described. The apparatus may include a processor, memory coupled with the processor, and instructions stored in the memory. The instructions may be executable by the processor to cause the apparatus to receive, from a base station, configuration information for a first message of a two-step random access procedure between the UE and the base station, the configuration information including a connection-state dependent element indicating that the configuration information corresponds to a connection-state of the UE, transmit, to the base station and based on a current connection-state of the UE being the connection-state of the UE to which the configuration information corresponds, the first message of the two-step random access procedure, and monitor for a second message of the two-step random access procedure from the base station in response to the first message.

Another apparatus for wireless communications at a UE is described. The apparatus may include means for receiving, from a base station, configuration information for a first message of a two-step random access procedure between the UE and the base station, the configuration information including a connection-state dependent element indicating that the configuration information corresponds to a connection-state of the UE, transmitting, to the base station and based on a current connection-state of the UE being the connection-state of the UE to which the configuration information corresponds, the first message of the two-step random access procedure, and monitoring for a second message of the two-step random access procedure from the base station in response to the first message.

A non-transitory computer-readable medium storing code for wireless communications at a UE is described. The code may include instructions executable by a processor to receive, from a base station, configuration information for a first message of a two-step random access procedure between the UE and the base station, the configuration information including a connection-state dependent element indicating that the configuration information corresponds to a connection-state of the UE, transmit, to the base station and based on a current connection-state of the UE being the connection-state of the UE to which the configuration information corresponds, the first message of the two-step random access procedure, and monitor for a second message of the two-step random access procedure from the base station in response to the first message.

In some examples of the method, apparatuses, and non-transitory computer-readable medium described herein, receiving the configuration information may include operations, features, means, or instructions for descrambling the configuration information based on a connection-state specific radio network temporary identifier (RNTI) associated with the connection-state of the UE, where the connection-state of the UE may be one of an RRC idle mode, an RRC inactive mode, or an RRC connected mode.

Some examples of the method, apparatuses, and non-transitory computer-readable medium described herein may further include operations, features, means, or instructions for receiving second configuration information for the first message of the two-step random access procedure, where the second configuration information includes a second connection-state dependent element indicating that the second configuration information corresponds to a second connection-state of the UE different from the current connection-state of the UE, and descrambling the second configuration information based on a second connection-state specific RNTI associated with the second connection-state of the UE.

Some examples of the method, apparatuses, and non-transitory computer-readable medium described herein may further include operations, features, means, or instructions for descrambling the configuration information based on a group specific RNTI associated with multiple connection-states of the UE, where the multiple connection-states include an RRC idle mode and an RRC inactive mode.

Some examples of the method, apparatuses, and non-transitory computer-readable medium described herein may further include operations, features, means, or instructions for receiving second configuration information for the first message of the two-step random access procedure, where the second configuration information includes a second connection-state dependent element indicating that the second configuration information corresponds to a second connection-state of the UE different from the connection-state of the UE, and descrambling the second configuration information based on a second group specific RNTI associated with the second connection-state of the UE.

In some examples of the method, apparatuses, and non-transitory computer-readable medium described herein, the configuration information includes preamble resource information, physical uplink shared channel (PUSCH) resource information, transport block size (TBS), modulation and coding scheme (MCS), waveform, demodulation reference signal (DMRS) resource information, a mapping of a preamble to a PUSCH resource unit (PRU), an association between a synchronization signal block (SSB) and preamble occasion (RO) or PUSCH occasion (PO), or any combination thereof.

Some examples of the method, apparatuses, and non-transitory computer-readable medium described herein may further include operations, features, means, or instructions for descrambling the configuration information based on a group specific RNTI associated with multiple connection-states of the UE, where the multiple connection-states include an RRC inactive mode and an RRC connected mode.

Some examples of the method, apparatuses, and non-transitory computer-readable medium described herein may further include operations, features, means, or instructions for receiving second configuration information for the first message of the two-step random access procedure, where the second configuration information includes a second connection-state dependent element indicating that the second configuration information corresponds to a second connection-state of the UE different from the current connection-state of the UE, descrambling the second configuration information based on a second group specific RNTI associated with the second connection-state of the UE, selecting a value for a preamble resource, PUSCH resource, TBS, MCS, waveform, DMRS resource, a preamble to a PRU mapping, an SSB to RO or PO association, from a union of the first and the second configuration information, from the second configuration information only, or from the first configuration information only, and applying the selected value to the first message of the two-step random access procedure for transmitting the first message to the base station.

Some examples of the method, apparatuses, and non-transitory computer-readable medium described herein may further include operations, features, means, or instructions for transmitting the first message of the two-step random access procedure according to at least a portion of the second configuration information.

Some examples of the method, apparatuses, and non-transitory computer-readable medium described herein may further include operations, features, means, or instructions for receiving the configuration information for the first message via a first signal, and receiving a second signal different from the first signal, the second signal including second configuration information for the first message of the two-step random access procedure, where the second configuration information includes a second connection-state dependent element indicating that the second configuration information corresponds to a second connection-state of the UE different from the current connection-state of the UE.

In some examples of the method, apparatuses, and non-transitory computer-readable medium described herein, the second configuration information corresponds to multiple connection-states of the UE, each of which may be different from the current connection-state of the UE.

Some examples of the method, apparatuses, and non-transitory computer-readable medium described herein may further include operations, features, means, or instructions for receiving second configuration information for the first message of the two-step random access procedure, where the second configuration information includes a second connection-state dependent element indicating that the second configuration information corresponds to a second connection-state of the UE different from the current connection-state of the UE, and transmitting the first message of the two-step random access procedure according to at least a portion of the second configuration information.

Some examples of the method, apparatuses, and non-transitory computer-readable medium described herein may further include operations, features, means, or instructions for preamble resource information of the first configuration information at least partially overlaps preamble resource information of the second configuration information, or PUSCH resource information of the first configuration information at least partially overlaps PUSCH resource information of the second configuration information, or DMRS resource information of the first configuration information at least partially overlaps DMRS resource information of the second configuration information, or TBS information of the first configuration information at least partially overlaps TBS information of the second configuration information, MCS information of the first configuration information at least partially overlaps MCS information of the second configuration information, or a mapping relation between preamble and PRU of the first configuration information at least partially overlaps the mapping relation between preamble and PRU of the second configuration information, or an association pattern between SSB and RO or PO of the first configuration information at least partially overlaps the association pattern between SSB and preamble RO or PUSCH PO of the second configuration information.

Some examples of the method, apparatuses, and non-transitory computer-readable medium described herein may further include operations, features, means, or instructions for receiving the second configuration information in a signal different from the first configuration information while UE may be in the current connected state, decoding both the second configuration information and the first configuration information, and transmitting, by the UE in the current connected-state, the first message based on only one of the first configuration information or the second configuration information.

Some examples of the method, apparatuses, and non-transitory computer-readable medium described herein may further include operations, features, means, or instructions for failing to decode the first configuration information while the UE may be in the current connected-state, and transmitting, by the UE in the current connected-state, the first message based on the second configuration information corresponding to the second connection-state of the UE.

Some examples of the method, apparatuses, and non-transitory computer-readable medium described herein may further include operations, features, means, or instructions for receiving system information that indicates second configuration information for the first message of the two-step random access procedure, where the second configuration information includes a second connection-state dependent element indicating that the second configuration information corresponds to a second connection-state of the UE different from the connection-state of the UE, receiving RRC signaling that includes the configuration information corresponding to the second connection-state of the UE, and transmitting the first message of the two-step random access procedure according to the configuration information independent of the system information.

Some examples of the method, apparatuses, and non-transitory computer-readable medium described herein may further include operations, features, means, or instructions for determining the current connection-state of the UE as one of an RRC idle mode, an RRC inactive mode, or an RRC connected mode.

Some examples of the method, apparatuses, and non-transitory computer-readable medium described herein may further include operations, features, means, or instructions for receiving the configuration information via an SSB, a SIB, a paging message, an RRC message, or any combination thereof.

A method of wireless communications at a base station is described. The method may include transmitting, to a UE, configuration information for a first message of a two-step random access procedure between the UE and the base station, the configuration information including a connection-state dependent element indicating that the configuration information corresponds to a connection-state of the UE, receiving, from the UE and based on a current connection-state of the UE being the connection-state of the UE to which the configuration information corresponds, the first message of the two-step random access procedure, and transmitting a second message of the two-step random access procedure to the UE in response to the first message.

An apparatus for wireless communications at a base station is described. The apparatus may include a processor, memory coupled with the processor, and instructions stored in the memory. The instructions may be executable by the processor to cause the apparatus to transmit, to a UE, configuration information for a first message of a two-step random access procedure between the UE and the base station, the configuration information including a connection-state dependent element indicating that the configuration information corresponds to a connection-state of the UE, receive, from the UE and based on a current connection-state of the UE being the connection-state of the UE to which the configuration information corresponds, the first message of the two-step random access procedure, and transmit a second message of the two-step random access procedure to the UE in response to the first message.

Another apparatus for wireless communications at a base station is described. The apparatus may include means for transmitting, to a UE, configuration information for a first message of a two-step random access procedure between the UE and the base station, the configuration information including a connection-state dependent element indicating that the configuration information corresponds to a connection-state of the UE, receiving, from the UE and based on a current connection-state of the UE being the connection-state of the UE to which the configuration information corresponds, the first message of the two-step random access procedure, and transmitting a second message of the two-step random access procedure to the UE in response to the first message.

A non-transitory computer-readable medium storing code for wireless communications at a base station is described. The code may include instructions executable by a processor to transmit, to a UE, configuration information for a first message of a two-step random access procedure between the UE and the base station, the configuration information including a connection-state dependent element indicating that the configuration information corresponds to a connection-state of the UE, receive, from the UE and based on a current connection-state of the UE being the connection-state of the UE to which the configuration information corresponds, the first message of the two-step random access procedure, and transmit a second message of the two-step random access procedure to the UE in response to the first message.

Some examples of the method, apparatuses, and non-transitory computer-readable medium described herein may further include operations, features, means, or instructions for scrambling the configuration information based on a connection-state specific RNTI, where the connection-state specific RNTI may be associated with one of an RRC idle mode, an RRC inactive mode, or an RRC connected mode, and scrambling second configuration information for the first message of the two-step random access procedure based on a second connection-state specific RNTI different from the connection-state specific RNTI, where the second configuration information includes a second connection-state dependent element indicating that the second configuration information corresponds to a second connection-state of the UE different from the connection-state of the UE.

Some examples of the method, apparatuses, and non-transitory computer-readable medium described herein may further include operations, features, means, or instructions for scrambling the configuration information based on a group specific RNTI, where the group specific RNTI may be associated with both an RRC idle mode and an RRC inactive mode.

Some examples of the method, apparatuses, and non-transitory computer-readable medium described herein may further include operations, features, means, or instructions for scrambling the configuration information based on a group specific RNTI, where the group specific RNTI may be associated with both an RRC inactive mode and an RRC connected mode.

Some examples of the method, apparatuses, and non-transitory computer-readable medium described herein may further include operations, features, means, or instructions for transmitting the configuration information for the first message via a first signal, and transmitting a second signal different from the first signal, the second signal including second configuration information for the first message of the two-step random access procedure, where the second configuration information includes a second connection-state dependent element indicating that the second configuration information corresponds to a second connection-state of the UE different from the connection-state of the UE.

In some examples of the method, apparatuses, and non-transitory computer-readable medium described herein, the second configuration information corresponds to multiple connection-states of the UE, and the second configuration information may be different from the first configuration information for TBS, MCS, DMRS resource, preamble resource, PUSCH resource, preamble to PRU mapping, SSB to preamble RO or PO association, or any combination thereof.

In some examples of the method, apparatuses, and non-transitory computer-readable medium described herein, a preamble resource of the first configuration information overlaps a preamble resource of a second configuration information, where the second configuration information includes a second connection-state dependent element indicating that the second configuration information corresponds to a second connection-state of the UE different from the current connection-state of the UE.

In some examples of the method, apparatuses, and non-transitory computer-readable medium described herein, one or multiple values of the first configuration information overlaps with one or multiple values of a second configuration information for TBS, MCS, DMRS resource, preamble resource, PUSCH resource, preamble to PRU mapping, SSB to preamble RO or PO association, or any combination thereof, and where the second configuration information includes a second connection-state dependent element indicating that the second configuration information corresponds to a second connection-state of the UE different from the current connection-state of the UE.

In some examples of the method, apparatuses, and non-transitory computer-readable medium described herein, the current connection-state of the UE as one of an RRC idle mode, an RRC inactive mode, or an RRC connected mode.

Some examples of the method, apparatuses, and non-transitory computer-readable medium described herein may further include operations, features, means, or instructions for transmitting the configuration information via an SSB, a SIB, a paging message, an RRC message, or any combination thereof.

In some examples of the method, apparatuses, and non-transitory computer-readable medium described herein, the configuration information includes preamble resource information, PUSCH resource information, TBS, MCS, waveform, DMRS resource information, a mapping of a preamble to a PRU, an association between an SSB and RO or PO, or any combination thereof.

DETAILED DESCRIPTION

Figure 1:
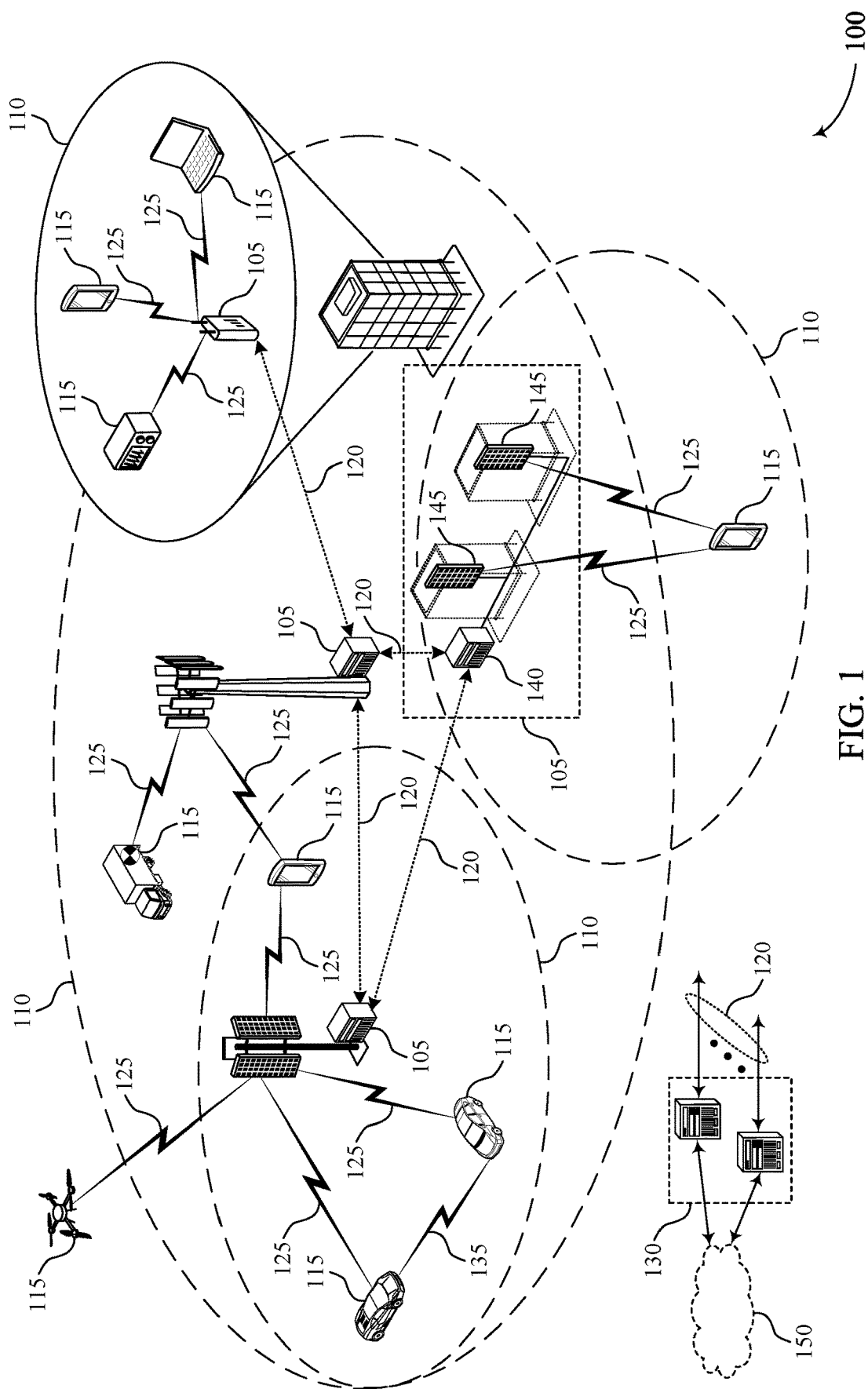
FIG. 1 illustrates an example of a wireless communications system that supports message configuration for two-step random access procedure in accordance with aspects of the present disclosure.

A UE may communicate with a base station serving a cell by establishing a connection with the base station using a two-step random access procedure. The two-step random access procedure may involve messages transmitted via the random access channel (RACH) in which a user equipment (UE) transmits one or more signals in order to facilitate communication with a base station without prior scheduling. For example, rather than communicating on resources allocated (e.g., by the base station) for the UE, the UE may establish communication with the base station through transmissions via the RACH, a channel for non-scheduled communications, and the base station may schedule resources for the UE or may allow the UE to utilize unscheduled resources for communication.

Once powered on, a UE in a wireless communications system, may operate in a given mode or connected-state such as an idle radio resource control (RRC) state (RRC IDLE), an inactive RRC state (RRC INACTIVE), or a connected RRC state (RRC CONNECTED). These states may correspond to the state of the UE and its connection to the network with respect to whether RRC connection setup has occurred (RRC CONNECTED), has been suspended (RRC INACTIVE), or has not yet been establish or has been released (RRC IDLE). The RRC idle may occur in cases where a UE receives an RRC release message from a base station, which may be based on a cell reselection or other reconnection process by the UE or the base station. RRC inactive may occur in cases where a UE receives an RRC suspend message, while RRC connected may occur in cases where a UE receives an RRC connection establishment confirmation.

In a two-step random access procedure, a UE may transmit a first random access message (e.g., Msg1 or MsgA), which may include a preamble for initiating communication with a base station. The transmission of the first random access message by the UE may be impacted by the RRC state of the UE and the network. For example, the traffic pattern and potential payload size of the first random access message may depend on the RRC state, due to the distinctive type of connection, registration, and session management information corresponding to the RRC stated and managed by the core network. The varying traffic pattern and payload size of the first random access message transmitted by the UE may decrease efficiency and overuse resource allocation.

In order to improve signaling flexibility and resource utilization, the base station may periodically transmit configuration information to one or more UEs in the network. In some cases, random access message configurations may be configured by the base station and may vary based on the connected-state (e.g., the RRC state) of the UE. For example, configuration information for idle and inactive RRC states may be transmitted in synchronization signal block (SSB) configuration information, paging information, or in a system information block (SIB) and configuration information corresponding to RRC connected state may be transmitted by the base station in RRC signaling, SSB configuration information, or in a SIB.

The random access configuration information transmitted by the base station may include a set of information elements (IEs). Each IE may indicate configuration information that the UE may use for transmission of the random access preamble or payload of the first message. The configuration information may be transmitted by different downlink signaling (e.g., SIB, SSB, or RRC) depending on the RRC state of the UE, and may also indicate different configurations (e.g., different configuration information or different values for one or more of the IEs) depending on the RRC state of the UE. In some examples, the configuration information may be scrambled differently depending on the RRC state (e.g., configuration information for RRC inactive may be scrambled differently than configuration information for RRC connected), and may, additionally or alternative, be transmitted using different signaling.

Based on the configuration information received from the base station and the current RRC state of the UE, the UE may generate and transmit the first random access message as part of the two-step random access procedure with the base station. Once transmitted, the UE may monitor for a response from the base station, such as a Msg2 or MsgB transmission from the base station in response to the first message.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to message configuration for two-step random access procedure.

FIG. 1 illustrates an example of a wireless communications system 100 that supports message configuration for two-step random access procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may initiate a random access procedure (e.g., a two-step random access procedure, a four step random access procedure, or another random access procedure) with a base station 105 in order to communicate with base station 105. The random access procedure may be initiated through transmission of an initial message (e.g., MsgA or Msg1 of a two-step random access procedure) over resources allocated for random access procedures (e.g., RACH resources), which may not be scheduled or allocated for use by a given UE 115, but instead may be available to all UEs 115 in the wireless communications system 100 wishing to connect with and communication with a base station 105. For example, the UE 115 may initiate the procedure my transmitting a random access message along with an associated preamble to the base station 105.

The transmission of the random access message may depend on the connected-state (e.g., RRC state) of the UE 115. For instance, one or more transmission parameters such as transport block size (TBS), MCS, demodulation reference signal (DMRS) resource information, waveform type, among other parameters, may be indicated to the UE 115 through a configuration (e.g., a message indicating a configuration for the first message of the two-step random access procedure) from the base station 105, and may vary depending on the connected-state of the UE 115. In some cases, a UE 115 operating in a given RRC state may transmit a random access message with a different payload size or using different resources than the same UE 115 (or another UE 115) operating in a different RRC state. In order to improve resource utilization, a base station 105 may periodically transmit configuration information to one or more UEs 115, which the UEs 115 may use to determine or modify transmission of the initial message of the two-step random access procedure (e.g., based on the RRC state).

Figure 2:
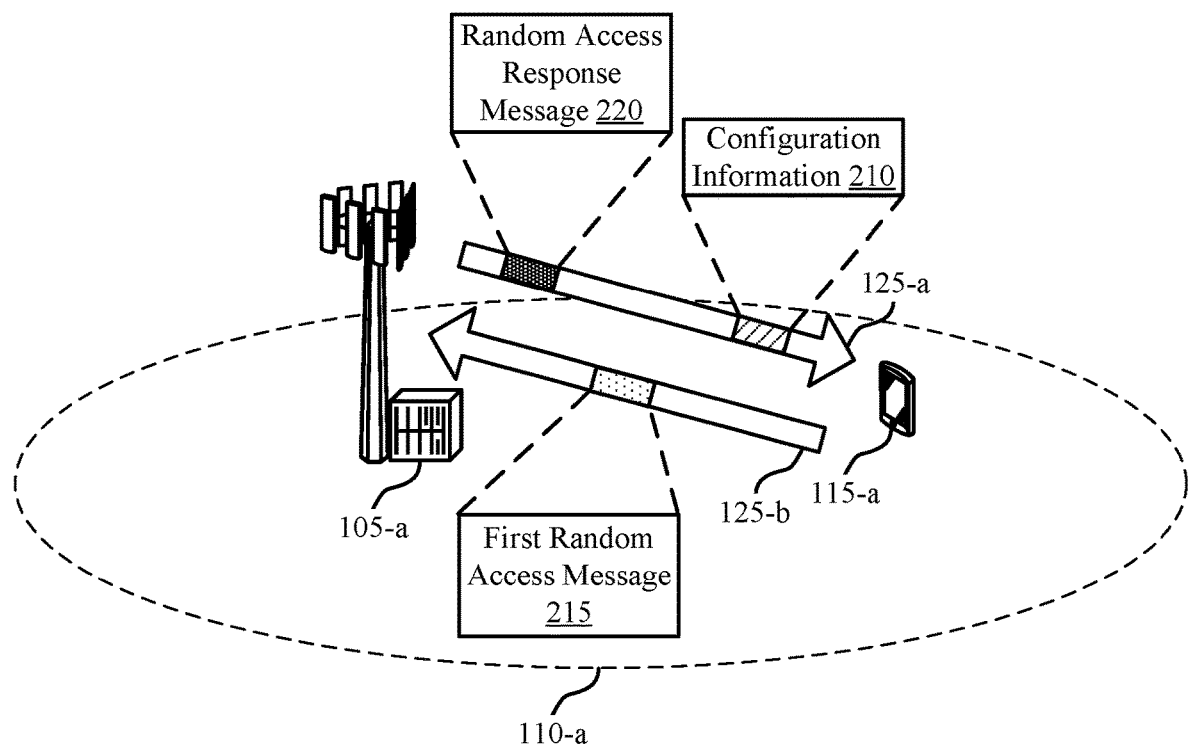
FIG. 2 illustrates an example of a wireless communications system that supports message configuration for two-step random access procedure in accordance with aspects of the present disclosure.

FIG. 2 illustrates an example of a wireless communications system 200 that supports message configuration for two-step random access procedure in accordance with aspects of the present disclosure. In some examples, wireless communications system 200 may implement aspects of wireless communications system 100. For example, wireless communications system 200 may include UE 115-a, which may be an example of a UE 115 as described with respect to FIG. 1. Wireless communications system 200 may also include base station 105-a, which may be an example of a base station 105 as described with respect to FIG. 1. Base station 105-a may serve a coverage area 110-a (e.g., base station 105 may support communication with one or more devices over coverage area 110-a), and may communicate with a UE 115-a served by base station 105-a using communication links 125 (e.g., communication links 125-a and 125-b).

UE 115-a may communicate with base station 105-a using a two-step RACH process to initiate communications without prior scheduling information from base station 105-a. A two-step RACH process may include the transmission, by UE 115-a, of a first random access message 215 (e.g., RACH MsgA), which may include a preamble, followed by transmission, by the base station 105-a, of a random access response message 220 in response to the first random access message 215.

During a random access procedure such as a two-step random access procedure, the traffic pattern and payload size of the first random access message 215 sent by UE 115-a may vary. This variance may be due to different types of connection (e.g., connected-state such as the RRC state of the UE 115-a, which may change based on RRC signaling transmitted from the base station 105-a to the UE 115-a), registration, and session management processes and procedures by the core network. To reduce inefficiencies caused by the varying traffic pattern and payload size of the first random access message 215 transmitted by UE 115-a, base station 105-a may periodically transmit configuration information 210 to UE 115-a. The configuration information 210 may include one or more parameters for the first random access message 215 of the two-step random access procedure. Configuration information 210 may be transmitted by base station 105-a in SSB configuration information, which may be included in a SIB periodically broadcasted by base station 105-a. In other cases, base station 105-a may transmit configuration information 210 in a unicast transmission to UE 115-a, or in a paging transmission. UE 115-a may receive configuration information 210 before transmitting first random access message 215.

Configuration information 210 may indicate a set of transmission parameters for the first message of the two-step random access procedure via a set of IEs in the configuration information 210. One IE may be an RRC state IE, which may indicate one or more of an RRC idle field, an RRC inactive field, and an RRC connected field and specifies the RRC state to which the configuration information corresponds.

Another IE in configuration information 210 may be a preamble resource configuration IE for the first message of the two-step random access procedure. This IE may include configurable fields that indicate resources for a preamble of the first message and may include a preamble sequence index field, a preamble occasion (RO) or RACH occasion (RO) index field, a physical random access channel (PRACH) slot index field, and an RO sharing status between two-step and four step RACH field(s).

Another IE in configuration information 210 may be a PUSCH resource unit (PRU) configuration IE. This field may include configurable fields for demodulation reference signal (DMRS) resource configuration information such as a number of DMRS symbols field, a DMRS type field, a DMRS port index field, DMRS sequence indices field, a flag for transform precoding field, a flag for DMRS sequence hopping, and other fields. The PRU configuration may also include or indicate a PUSCH occasion (PO) configuration. The PO configuration may include a number of fields such as a TBS, MCS field, time resource size and frequency resource size, a guard band field, a guard period first, a enabled/disabled TBS repetition field, a PUSCH mapping type of PO groups field, a frequency-domain starting point of PO groups with respect to the first physical resource block (PRB) of the active uplink BWP, a time-domain starting point of PO groups with respect to the boundary of the associated PRACH slot, and other fields.

Configuration information 210 may also include a preamble to PRU mapping type IE. This may include a set of configurable fields including 1 to 1, 1 to M1 (i.e., one to many, where M1 is an integer greater than 1), M2 to 1 (i.e., many to one, where M2 is an integer that is great than 1 and may be the same or different than M1). The configuration information for the first RACH message may also include an SSB to RO or PO association pattern IE.

In some cases, the configuration information 210 for different RRC states may be scrambled by different radio network temporary identifiers (RNTIs) such that configuration information 210 for a first RRC state is scrambled with a different RNTI than the configuration information 210 for a second RRC state. In other examples, a group RNTI may be used to scramble configuration information 210 for a set of RRC states, and a different RNTI or group RNTI may be used to scramble configuration information for a different set of RRC states. Additionally or alternatively, configuration information 210 for different RRC states may be transmitted using different downlink signaling (e.g., a first signal may be used to indicate configuration information 210 for a first RRC state and a second different signal may be used to indicate configuration information 210 for a second RRC state).

According to some aspects, UE 115-a may be configured for a two-step random access procedure in which configuration information 210 for RRC idle and RRC inactive states may be grouped into one macro state (e.g., RRC NON-CONNECTED state). Configuration information 210 for this macro state (RRC NON-CONNECTED) may share the same first random access message configuration and may be scrambled by the same group RNTI. That is, the configuration information 210 for RRC idle and RRC inactive states may be the same and, in some cases, may be indicated to the UE 115-a in a single message. In such cases, the first random access message configuration information for a connected-state (e.g., RRC CONNECTED) may be scrambled with a different RNTI or transmitted using different downlink signaling as compared to the configuration information for the RRC NON-CONNECTED state.

In other cases, UE 115-a may be configured for a two-step random access procedure in which configuration information 210 for RRC inactive and RRC connected states may be grouped into one macro state (e.g., Registration Management (RM) registered). Configuration information 210 for this macro state (RM Registered) may share the same first random access message configuration and may be scrambled by the same group RNTI. That is, the configuration information 210 for RRC inactive and RRC connected states may be the same and in some cases may be indicated to the UE 115-a in a single message. In such cases, the first random access message configuration information for RRC idle state (e.g., RRC IDLE) may be scrambled with a different RNTI or transmitted using different downlink signaling as compared to the configuration information for the RM Registered state.

In other cases, the downlink signaling mechanism used for transmitting the configuration information may not impact (e.g., may not be used to indicate or determine) the configuration for the first random access message of a two-step random access procedure. Additionally, or alternatively, the RRC signaling may be scheduled or waived for an RRC connected UE 115.

Configuration information 210 may also include an indication of time, frequency, or code resources for one or more UEs 115 (e.g., UE 115-a) that may be used for transmission of the first random access message. In some cases, the configuration information for RRC connected state and one of an RRC idle or inactive state may share configuration configurations, as indicated in configuration information 210. In these cases, a first random access message 215 from a UE 115-a in one RRC state may share or partially share time, frequency, or code resources with UEs 115 in other RRC states or the same UE 115-a in a different RRC state. Such configurations may occur in cases where there is no resource orthogonalization in time, frequency, or code domains, among other scenarios.

According to some aspects, the resource pools for a preamble of the first random access message 215, DMRS, and PUSCH configurations may overlap among different RRC states. In other cases, a UE 115-a in an RRC connected state may fail to decode the RRC signaling (e.g., configuration information 210 received in RRC signaling, or RRC signaling indicating the RRC state of the UE 115-a) and may fall back to a previous configuration for the first random access message 215, which may be indicated by SI. In any case, a UE 115-a in an RRC connected state may use configuration information 210 for the first random access message 215 signaled in different types of downlink signaling such as configuration information 210 signaled in both RRC signaling and SI, which may include or overlap configuration information 210 for the first random access message 215 for the RRC idle state or and the RRC inactive state.

In other cases, first random access preamble transmissions corresponding to different RRC states may be orthogonalized in time, frequency, or code domain resources. In such case, a UE 115-a in an RRC connected state may be configured through dedicated RRC signaling with separate preamble sequence sets, or a set of RO, DMRS port, or PO resources that are orthogonal to other UEs 115 supported by the base station 105-a (e.g., UEs 115 in a non-connected RRC state (e.g., idle or inactive)). In this case, UEs 115 in a non-connected RRC state may not fall back to the first random access preamble configuration indicated by the SI.

In another case, the first random access preamble configuration may be dependent on the RRC state. In this case, a UE 115-a may only apply the random access message configuration information scrambled by a corresponding RNTI. In this example, time, frequency, or code domain resources may be allocated to different group RNTI that may be orthogonalized.

Based on receiving configuration information 210 over communication link 125-a, UE 115-a may perform downlink synchronization, SI decoding, and measurement of frequencies and SSBs of base station 105-a. After performing one or more of these processes, UE 115-a may initiate a two-step random access procedure. UE 115-a may use the configuration information 210 received from base station 105-a to determine the configuration of the preamble for the first random access message 215, including traffic pattern, payload size, and other information based on the RRC state of UE 115-a. UE 115-a may transmit first random access message 215 to base station 105-a over communication link 125-b. First random access message 215 may include a random access preamble and a random access payload. In other cases, the random access payload may be transmitted by UE 115-*a* in a different message after the transmission of the random access preamble.

Based on the transmission of the first random access message 215, base station 105-*a* may transmit a random access response message 220 (e.g., MsgB) as part of the two-step random access procedure. The random access response message 220 may be a random access response message including a physical downlink control channel (PDCCH), a random access response physical downlink shared channel (PDSCH), or a combination thereof. The transmission of the random access response message 220 by base station 105-*a* may occur over communication link 125-*a*, and may indicate the completion of the two-step random access procedure.

Figure 3:
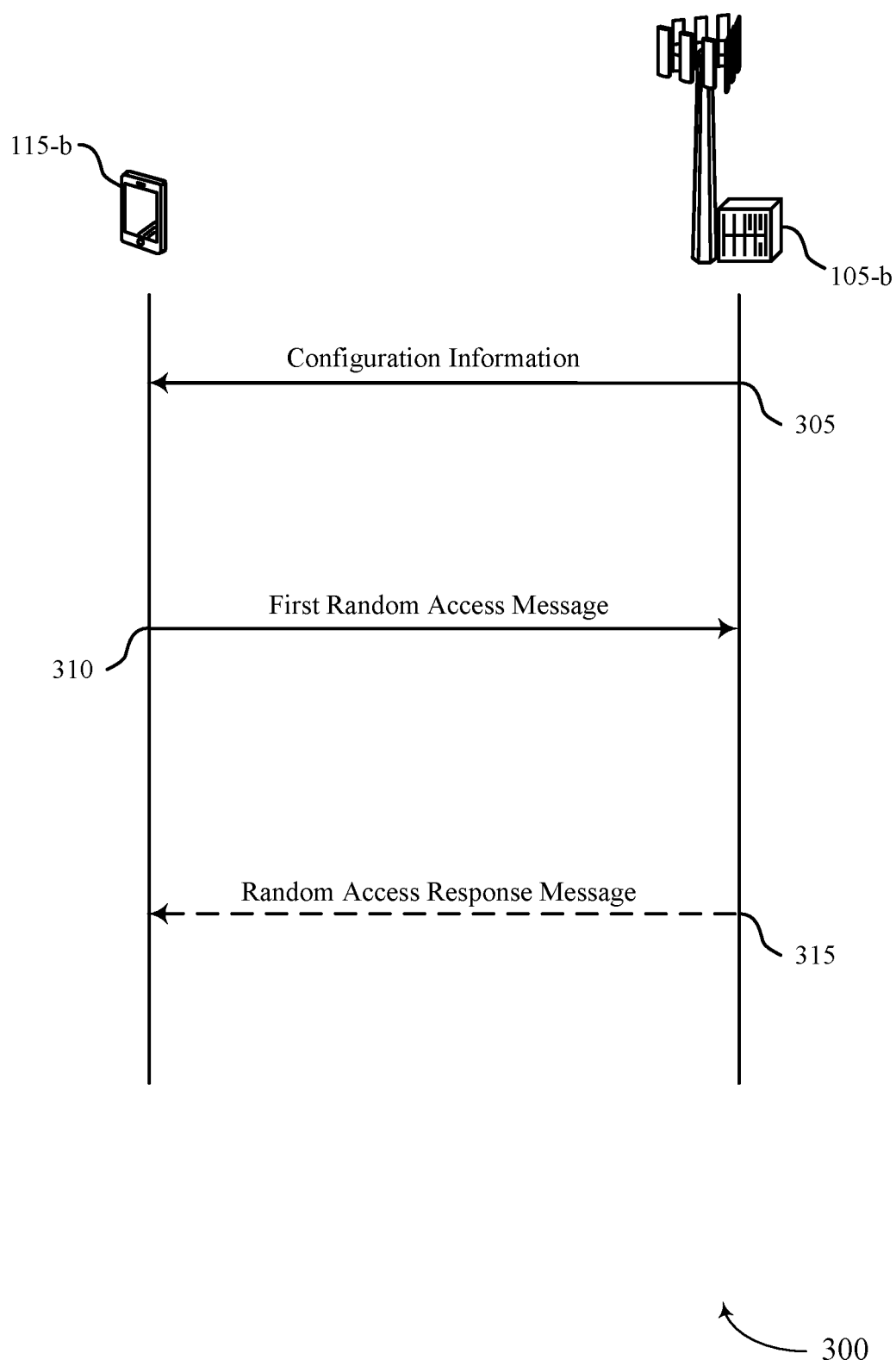
FIG. 3 illustrates an example of a process flow that supports message configuration for two-step random access procedure in accordance with aspects of the present disclosure.

FIG. 3 illustrates an example of a process flow 300 that supports message configuration for two-step random access procedure in accordance with aspects of the present disclosure. In some examples, process flow 300 may implement aspects of wireless communications systems 100 and 200. Process flow 300 may include UE 115-*b* and a base station 105-*b*, which may be examples of the corresponding devices as described with respect to FIGS. 1 and 2.

At 305, base station 105-*b* may transmit, to UE 115-*b*, configuration information for a first message of a two-step random access procedure between UE 115-*b* and base station 105-*a*. The configuration information may include a connection state elements (e.g., IEs) indicating that the configuration information corresponds to a connection state of UE 115-*b*. UE 115-*b* may receive the configuration information from base station 105-*a*. UE 115-*b* may receive the configuration information via an SSB, a SIB, a paging message, an RRC message, or a combination of these. The configuration information transmitted at 305 may be scrambled by base station 105-*b*, and may be descrambled by UE 115-*b* based on the configuration information.

The configuration information received at 305 may include preamble resource information, PUSCH resource information, TBS, MCS, waveform, DMRS resource information, a mapping of a preamble to a PRU, an association between an SSB and RO or PO, or any combination of these.

In some cases, UE 115-*b* may descramble the configuration information based on a connection-state specific RNTI associated with the connection state of UE 115-*b*. The connection-state of UE 115-*b* may be one or RRC idle mode, RRC inactive mode, or RRC connected mode. UE 115-*b* may also receive second configuration information for the first message of the two-step random access procedure. The second configuration information may include a second connection-state dependent elements indicating that the second configuration information corresponds to a second connection-state of UE 115-*b*, which may be different from the current connection-state of UE 115-*b*. UE 115-*b* may descramble the second configuration information based on a second connection-state specific RNTI associated with the second connection-state of UE 115-*b*.

In other cases, UE 115-*b* may descramble the configuration information received at 305 based on a group RNTI that may be associated with multiple connection-states of UE 115-*b*. The multiple connection-states of UE 115-*b* in this case may include an RRC idle mode and an RRC inactive mode. UE 115-*b* may receive second configuration information for the first message of the two-step random access procedure. The second configuration information may include a second connection-state dependent element indicating that the second configuration information may correspond to a second connection-state of UE 115-*b*, which may be different from the connection-state of UE 115-*b*. In this case, UE 115-*b* may descramble the second configuration information based on a second group-specific RNTI that may be associated with the second connection-state of UE 115-*b*.

In some cases, UE 115-*b* may receive the configuration information for the first signal via a first signal. UE 115-*b* may also receive a second signal different from the first signal. The second signal may include second configuration information for the first message of the two-step random access procedure. The second configuration information may include a second connection-state dependent element indicating that the second configuration information may correspond to a second connection-state of UE 115-*b* different from the current connection-state of UE 115-*b*. In some examples, the second configuration information may correspond to multiple connection-states of UE 115-*b*, each of which may be different from the current connection-state of UE 115-*b*.

In some other cases, UE 115-*b* may receive second configuration information for the first message of the two-step random access procedure, where the second configuration information may include a second connection-state dependent element that may indicate that the second configuration information may correspond to a second connection-state of UE 115-*b* that may be different from the current connection-state of UE 115-*b*. In these cases, UE 115-*b* may transmit, at 310, the first message of the two-step random access procedure, which may be according to at least a portion of the second configuration information. Further, in these cases, the preamble resource information of the first configuration information may at least partially overlap with preamble resource information of the second configuration information, or PUSCH resource information of the first configuration information may at least partially overlap with PUSCH resource information of the second configuration information, or DMRS resource information of the first configuration information may at least partially overlap with DMRS resource information of the second configuration information, or TBS information of the first configuration information may at least partially overlaps TBS information of the second configuration information, or MCS information of the first configuration information may at least partially overlap with MCS information of the second configuration information, or a mapping relation between preamble and PRU of the first configuration information may at least partially overlap the mapping relation between preamble and PRU of the second configuration information, or an association pattern between SSB and preamble RO or PO of the first configuration information may at least partially overlap with the association pattern between SSB and preamble RO or PO of the second configuration information.

In some cases, UE 115-*b* may receive the second configuration information in a signal different from the first configuration information while UE 115-*b* is in the current connected state. UE 115-*b* may decode both the second configuration and the first configuration information, and may transmit the first message (at 310) based on the first configuration information or the second configuration information.

In other cases, UE 115-*b* may descramble the configuration information based on a group specific RNTI that may be associated with multiple connection-states of UE 115-*b*. The multiple connection-states may include an RRC inactive mode and an RRC connected mode. In some examples, UE 115-*b* may also receive second configuration information for the first message of the two-step random access procedure, where the second configuration information may include a second connection-state dependent element indicating that the second configuration information may correspond to a second connection-state of UE 115-*b* that is different from the current connection-state of UE 115-*b*. In these examples, UE 115-*b* may descramble the second configuration information based on a second group specific RNTI that may be associated with the second connection-state of UE 115-*b*.

In these examples, UE 115-*b* may also select a value for a preamble resource, PUSCH resource, TBS, MCS, waveform, DMRS resource, a preamble to a PRU mapping, an SSB to RO or PO association, from a union of the first and the second configuration information, from the second configuration information only, or from the first configuration information only. UE 115-*b* may apply the selected value to the first message of the two-step random access procedure for transmitting the first message to base station 105-*b*, which may occur at 310.

Further, UE 115-*b* may also receive second configuration information for the first message of the two-step random access procedure, where the second configuration information includes a second connection-state dependent element indicating that the second configuration information corresponds to a second connection-state of UE 115-*b*, which may be different from the current connection-state of UE 115-*b*. UE 115-*b* may then transmit the first message of the two-step random access procedure at 310 according to at least a portion of the second configuration information.

At 310, UE 115-*b* may transmit, to base station 105-*b*, and based on a current connection-state of UE 115-*b* being the connection-state of UE 115-*b* to which the configuration information corresponds, the first message (e.g., a first random access message) of the two-step random access procedure. UE 115-*b* may determine the current connection-state of UE 115-*b* at one or RRC idle mode, RRC inactive mode, or RRC connected mode In some cases, UE 115-*b* may fail to decide the first configuration information while UE 115-*b* is in the current connected-state. In these cases, UE 115-*b* may transmit the first message at 310 based on the second configuration information corresponding to the second connection-state of UE 115-*b*.

In some cases, UE 115-*b* may receive system information that indicates second configuration information for the first message of the two-step random access procedure, where the second configuration information includes a second connection-state of UE 115-*b* that may be different from the connection-state of UE 115-*b*. In these cases, UE 115-*b* may also receive RRC signaling that may include configuration information that may correspond to the second connection state of UE 115-*b*. UE 115-*b* may then transmit the first message of the two-step random access procedure according to the configuration information, which may be independent of the system information.

At 315, UE 115-*b* may monitor for a random access response message of the two-step random access procedure from base station 105-*b* in response to the first random access message transmitted at 310 to base station 105-*b*.

Figure 4:
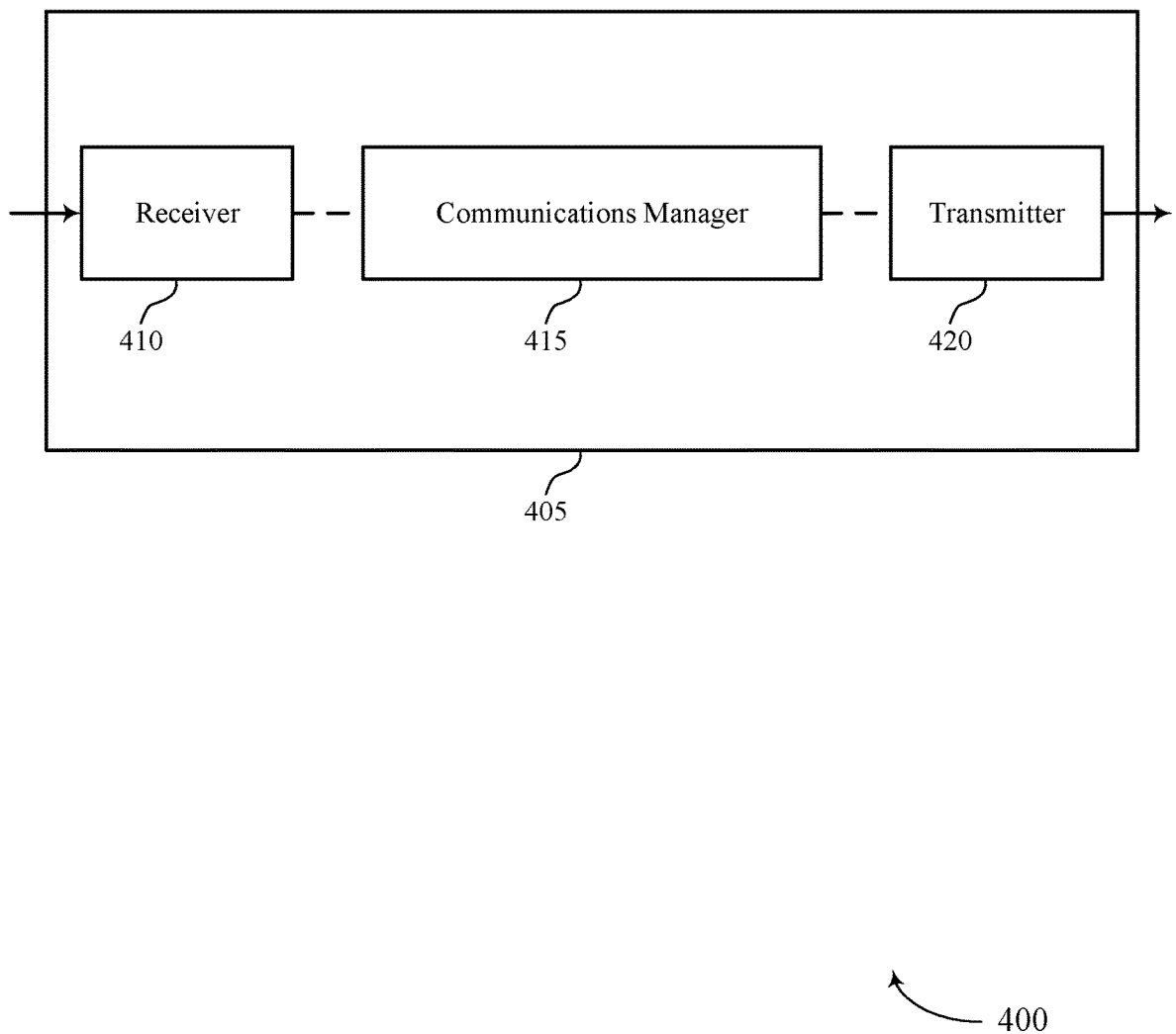
FIGS. 4 and 5 show block diagrams of devices that support message configuration for two-step random access procedure in accordance with aspects of the present disclosure.

FIG. 4 shows a block diagram 400 of a device 405 that supports message configuration for two-step random access procedure in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to message configuration for two-step random access procedure, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, configuration information for a first message of a two-step random access procedure between the UE and the base station, the configuration information including a connection-state dependent element indicating that the configuration information corresponds to a connection-state of the UE, transmit, to the base station and based on a current connection-state of the UE being the connection-state of the UE to which the configuration information corresponds, the first message of the two-step random access procedure, and monitor for a second message (e.g., a random access response message) of the two-step random access procedure from the base station in response to the first message. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

The actions performed by the communications manager 415 may be implemented to realize one or more potential advantages. One implementation may allow a UE 115 to save power and increase battery life by improving the resource utilization of the UE 115. This may allow for decreased signaling overhead, which may improve the efficiency of the UE 115. Another implementation may provide improved quality and reliability of service at the UE 115 by decreasing latency by improving resource utilization.

Figure 5:
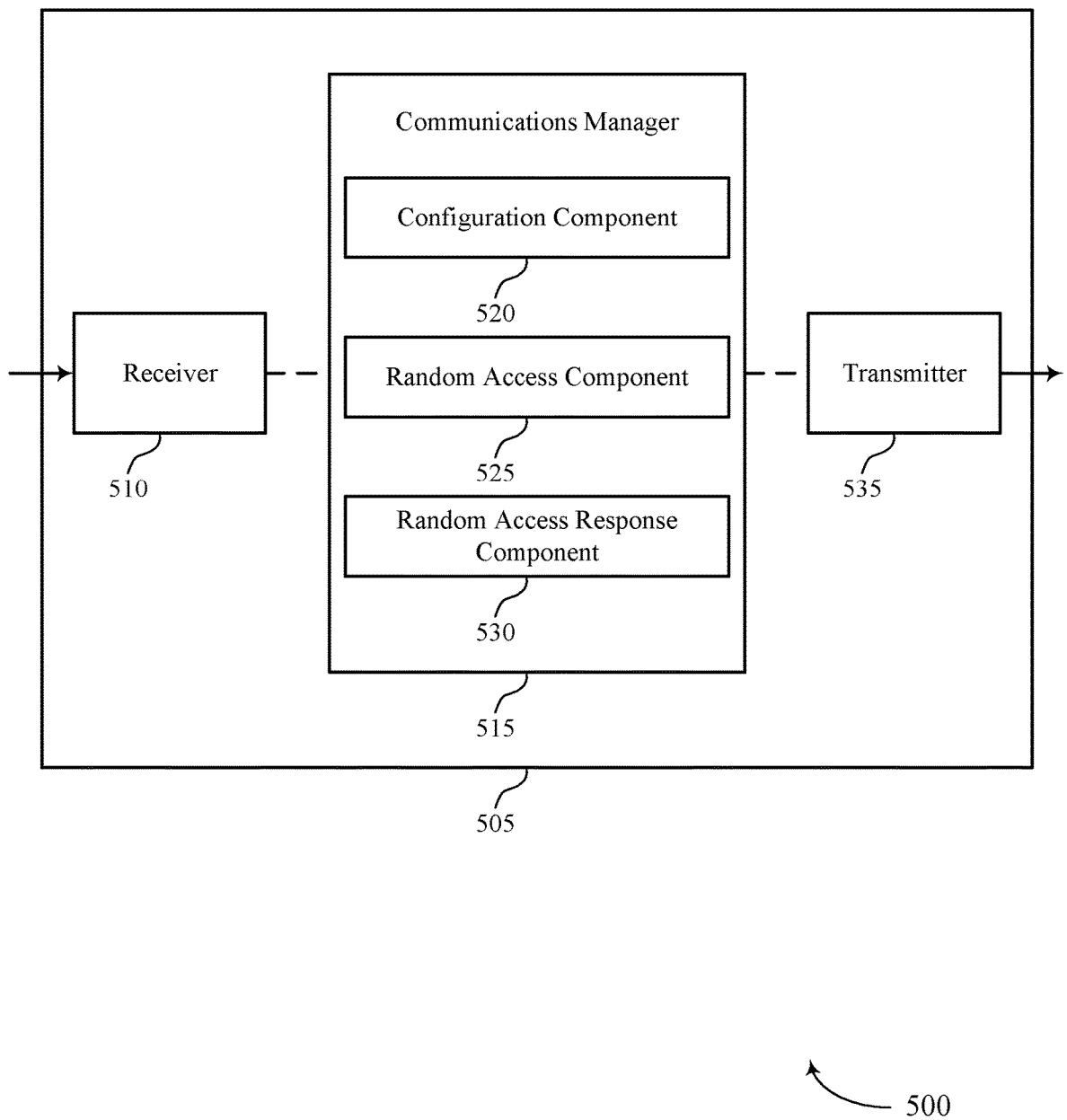

FIG. 5 shows a block diagram 500 of a device 505 that supports message configuration for two-step random access procedure in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to message configuration for two-step random access procedure, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configuration component 520, a random access component 525, and a random access response component 530. The communications manager 515 may be an example of aspects of the communications manager 710 described herein.

The configuration component 520 may receive, from a base station, configuration information for a first message of a two-step random access procedure between the UE and the base station, the configuration information including a connection-state dependent element indicating that the configuration information corresponds to a connection-state of the UE.

The random access component 525 may transmit, to the base station and based on a current connection-state of the UE being the connection-state of the UE to which the configuration information corresponds, the first message of the two-step random access procedure.

The random access response component 530 may monitor for a second message of the two-step random access procedure from the base station in response to the first message.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

A processor of a UE 115 may improve resource allocation of the resources used by the UE 115 for transmission of a first random access message of a two-step random access procedure between the UE and a base station 105. The processor may power on one or more processing units to control a receiver 510 to receive configuration information from a base station 105. The processor may use the configuration information to control the transmitter 535 to transmit a first random access message with efficient resource usage based on the RRC state information included in the configuration information received by receiver 510.

The processor may power on one or more processing units to control the transmission of the first random access message (e.g., MsgA) by transmitter 535.

Figure 6:
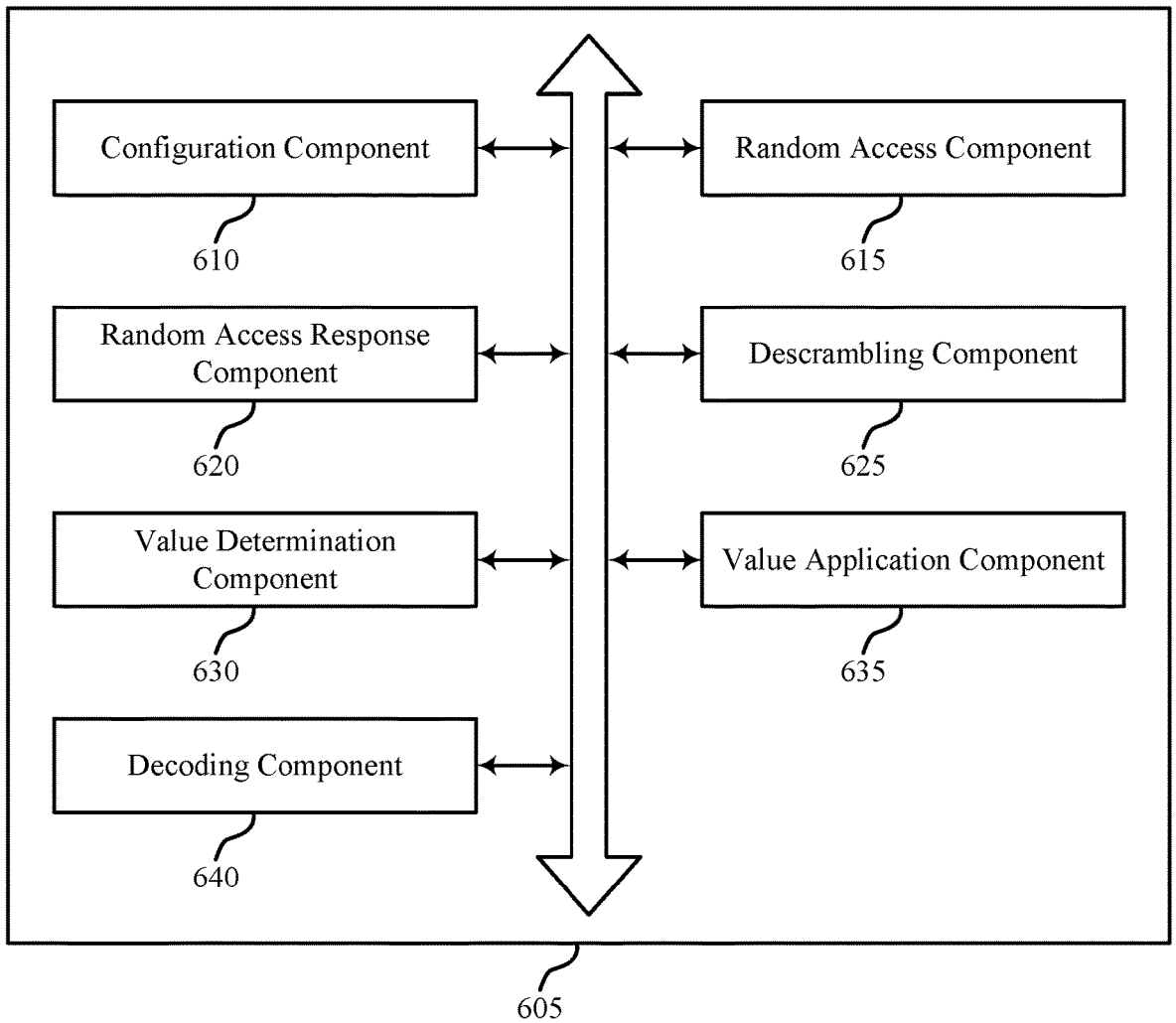
FIG. 6 shows a block diagram of a communications manager that supports message configuration for two-step random access procedure in accordance with aspects of the present disclosure.

FIG. 6 shows a block diagram 600 of a communications manager 605 that supports message configuration for two-step random access procedure in accordance with aspects of the present disclosure. The communications manager 605 may be an example of aspects of a communications manager 415, a communications manager 515, or a communications manager 710 described herein. The communications manager 605 may include a configuration component 610, a random access component 615, a random access response component 620, a descrambling component 625, a value determination component 630, a value application component 635, and a decoding component 640. Each of these modules may communicate, directly or indirectly, with one another (e.g., via one or more buses).

The configuration component 610 may receive, from a base station, configuration information for a first message of a two-step random access procedure between the UE and the base station, the configuration information including a connection-state dependent element indicating that the configuration information corresponds to a connection-state of the UE. In some examples, the configuration component 610 may receive second configuration information for the first message of the two-step random access procedure, where the second configuration information includes a second connection-state dependent element indicating that the second configuration information corresponds to a second connection-state of the UE different from the current connection-state of the UE. In some cases, the configuration component 610 may receive second configuration information for the first message of the two-step random access procedure, where the second configuration information includes a second connection-state dependent element indicating that the second configuration information corresponds to a second connection-state of the UE different from the connection-state of the UE.

In some examples, the configuration component 610 may receive the configuration information for the first message via a first signal. In some examples, the configuration component 610 may receive a second signal different from the first signal, the second signal including second configuration information for the first message of the two-step random access procedure, where the second configuration information includes a second connection-state dependent element indicating that the second configuration information corresponds to a second connection-state of the UE different from the current connection-state of the UE. In some aspects, configuration component 610 may receive second configuration information for the first message of the two-step random access procedure, where the second configuration information includes a second connection-state dependent element indicating that the second configuration information corresponds to a second connection-state of the UE different from the current connection-state of the UE.

In some examples, the preamble resource information of the first configuration information at least partially overlaps preamble resource information of the second configuration information, or PUSCH resource information of the first configuration information at least partially overlaps PUSCH resource information of the second configuration information, or DMRS resource information of the first configuration information at least partially overlaps DMRS resource information of the second configuration information, or TBS information of the first configuration information at least partially overlaps TBS information of the second configuration information, MCS information of the first configuration information at least partially overlaps MCS information of the second configuration information, or a mapping relation between preamble and PRU of the first configuration information at least partially overlaps the mapping relation between preamble and PRU of the second configuration information, or an association pattern between SSB and preamble RO or PO of the first configuration information at least partially overlaps the association pattern between SSB and preamble RO or PUSCH PO of the second configuration information.

In some examples, the configuration component 610 may receive the second configuration information in a signal different from the first configuration information while UE is in the current connected state. In some cases, configuration component 610 may receive SI that indicates second configuration information for the first message of the two-step random access procedure, where the second configuration information includes a second connection-state dependent element indicating that the second configuration information corresponds to a second connection-state of the UE different from the connection-state of the UE.

In some examples, configuration component 610 may receive RRC signaling that includes the configuration information corresponding to the second connection-state of the UE. In some examples, the configuration component 610 may determine the current connection-state of the UE as one of an RRC idle mode, an RRC inactive mode, or an RRC connected mode.

In some examples, the configuration component 610 may receive the configuration information via an SSB, a SIB, a paging message, an RRC message, or any combination thereof. In some cases, the configuration information includes preamble resource information, PUSCH resource information, TBS, MCS, waveform, DMRS resource information, a mapping of a preamble to a PRU, an association between an SSB and RO or PO, or any combination thereof. In some cases, the second configuration information corresponds to multiple connection-states of the UE, each of which is different from the current connection-state of the UE.

The random access component 615 may transmit, to the base station and based on a current connection-state of the UE being the connection-state of the UE to which the configuration information corresponds, the first message of the two-step random access procedure. In some examples, the random access component 615 may transmit the first message of the two-step random access procedure according to at least a portion of the second configuration information. In some cases, the random access component 615 may transmit, by the UE in the current connected-state, the first message based on only one of the first configuration information or the second configuration information. In some aspects, the random access component 615 may transmit, by the UE in the current connected-state, the first message based on the second configuration information corresponding to the second connection-state of the UE. In some instances, the random access component 615 may transmit the first message of the two-step random access procedure according to the configuration information independent of the system information.

The random access response component 620 may monitor for a second message of the two-step random access procedure from the base station in response to the first message.

The descrambling component 625 may descramble the configuration information based on a connection-state specific RNTI associated with the connection-state of the UE, where the connection-state of the UE is one of an RRC idle mode, an RRC inactive mode, or an RRC connected mode. In some examples, the descrambling component 625 may descramble the second configuration information based on a second connection-state specific RNTI associated with the second connection-state of the UE. In some cases, the descrambling component 625 may descramble the configuration information based on a group specific RNTI associated with multiple connection-states of the UE, where the multiple connection-states include an RRC idle mode and an RRC inactive mode. In some examples, the descrambling component 625 may descramble the second configuration information based on a second group specific RNTI associated with the second connection-state of the UE. In some examples, the descrambling component 625 may descramble the configuration information based on a group specific RNTI associated with multiple connection-states of the UE, where the multiple connection-states include an RRC inactive mode and an RRC connected mode. In some cases, the descrambling component 625 may descramble the second configuration information based on a second group specific RNTI associated with the second connection-state of the UE.

The value determination component 630 may select a value for a preamble resource, PUSCH resource, TBS, MCS, waveform, DMRS resource, a preamble to a PRU mapping, an SSB to RO or PO association, from a union of the first and the second configuration information, from the second configuration information only, or from the first configuration information only.

The value application component 635 may apply the selected value to the first message of the two-step random access procedure for transmitting the first message to the base station.

The decoding component 640 may decode both the second configuration information and the first configuration information. In some examples, the decoding component 640 may fail to decode the first configuration information while the UE is in the current connected-state.

Figure 7:
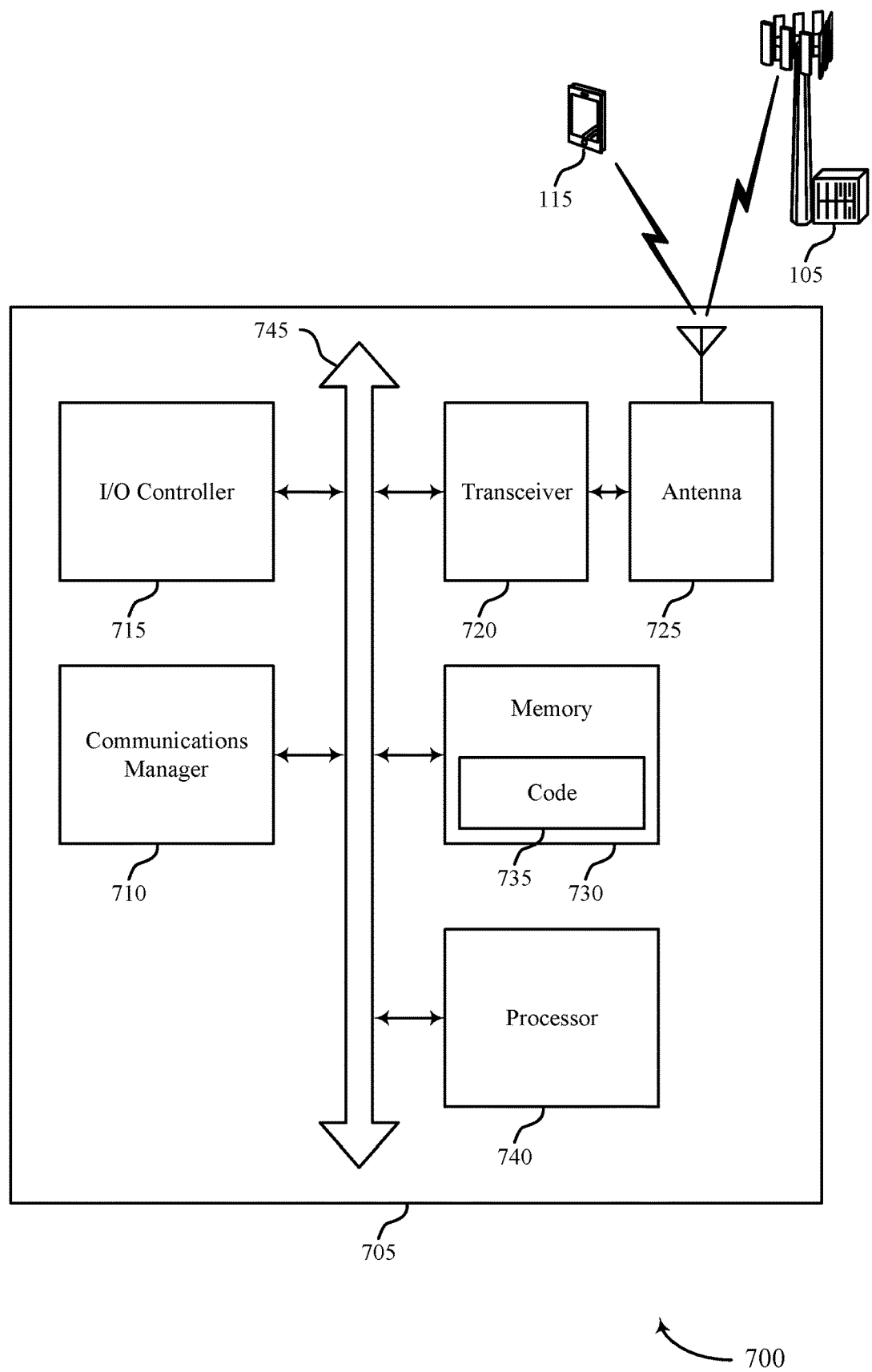
FIG. 7 shows a diagram of a system including a device that supports message configuration for two-step random access procedure in accordance with aspects of the present disclosure.

FIG. 7 shows a diagram of a system 700 including a device 705 that supports message configuration for two-step random access procedure in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, configuration information for a first message of a two-step random access procedure between the UE and the base station, the configuration information including a connection-state dependent element indicating that the configuration information corresponds to a connection-state of the UE, transmit, to the base station and based on a current connection-state of the UE being the connection-state of the UE to which the configuration information corresponds, the first message of the two-step random access procedure, and monitor for a second message of the two-step random access procedure from the base station in response to the first message.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the device 705 may include a single antenna 725. or the device 705 may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting message configuration for two-step random access procedure).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
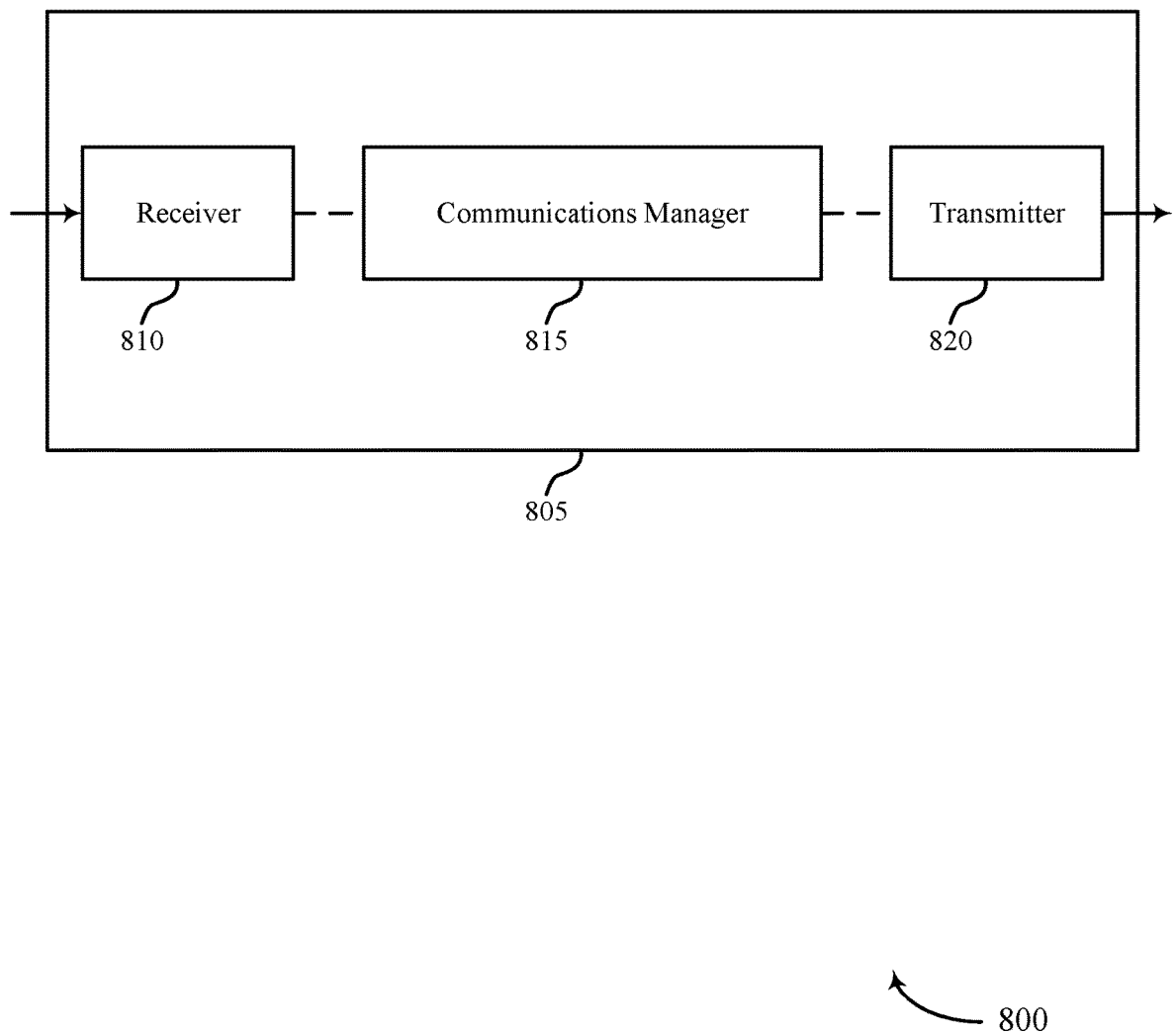
FIGS. 8 and 9 show block diagrams of devices that support message configuration for two-step random access procedure in accordance with aspects of the present disclosure.

FIG. 8 shows a block diagram 800 of a device 805 that supports message configuration for two-step random access procedure in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to message configuration for two-step random access procedure, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, configuration information for a first message of a two-step random access procedure between the UE and the base station, the configuration information including a connection-state dependent element indicating that the configuration information corresponds to a connection-state of the UE, receive, from the UE and based on a current connection-state of the UE being the connection-state of the UE to which the configuration information corresponds, the first message of the two-step random access procedure, and transmit a second message of the two-step random access procedure to the UE in response to the first message. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
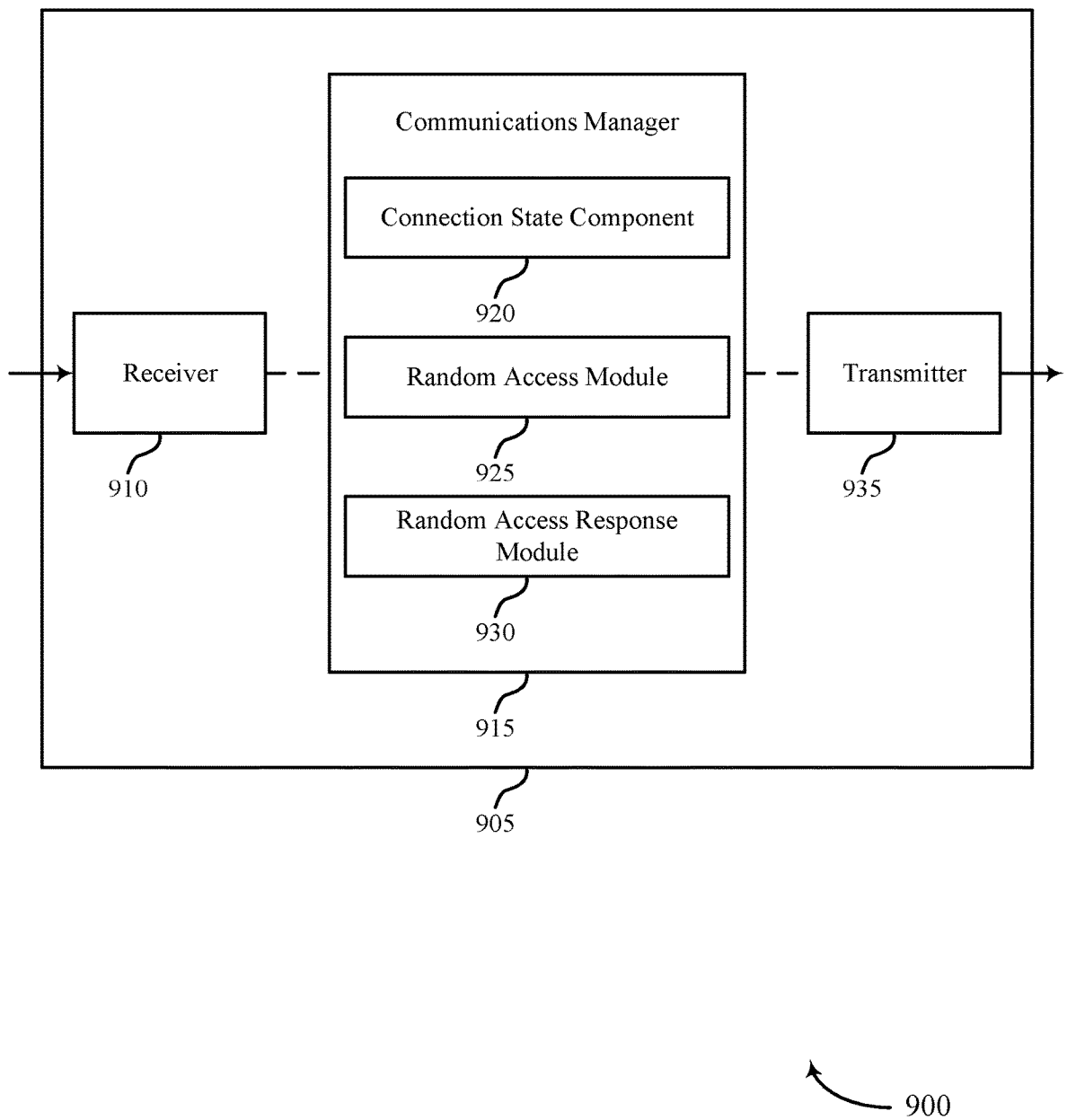

FIG. 9 shows a block diagram 900 of a device 905 that supports message configuration for two-step random access procedure in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to message configuration for two-step random access procedure, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a connection state component 920, a random access module 925, and a random access response module 930. The communications manager 915 may be an example of aspects of the communications manager 1110 described herein.

The connection state component 920 may transmit, to a UE, configuration information for a first message of a two-step random access procedure between the UE and the base station, the configuration information including a connection-state dependent element indicating that the configuration information corresponds to a connection-state of the UE.

The random access module 925 may receive, from the UE and based on a current connection-state of the UE being the connection-state of the UE to which the configuration information corresponds, the first message of the two-step random access procedure.

The random access response module 930 may transmit a second message of the two-step random access procedure to the UE in response to the first message.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
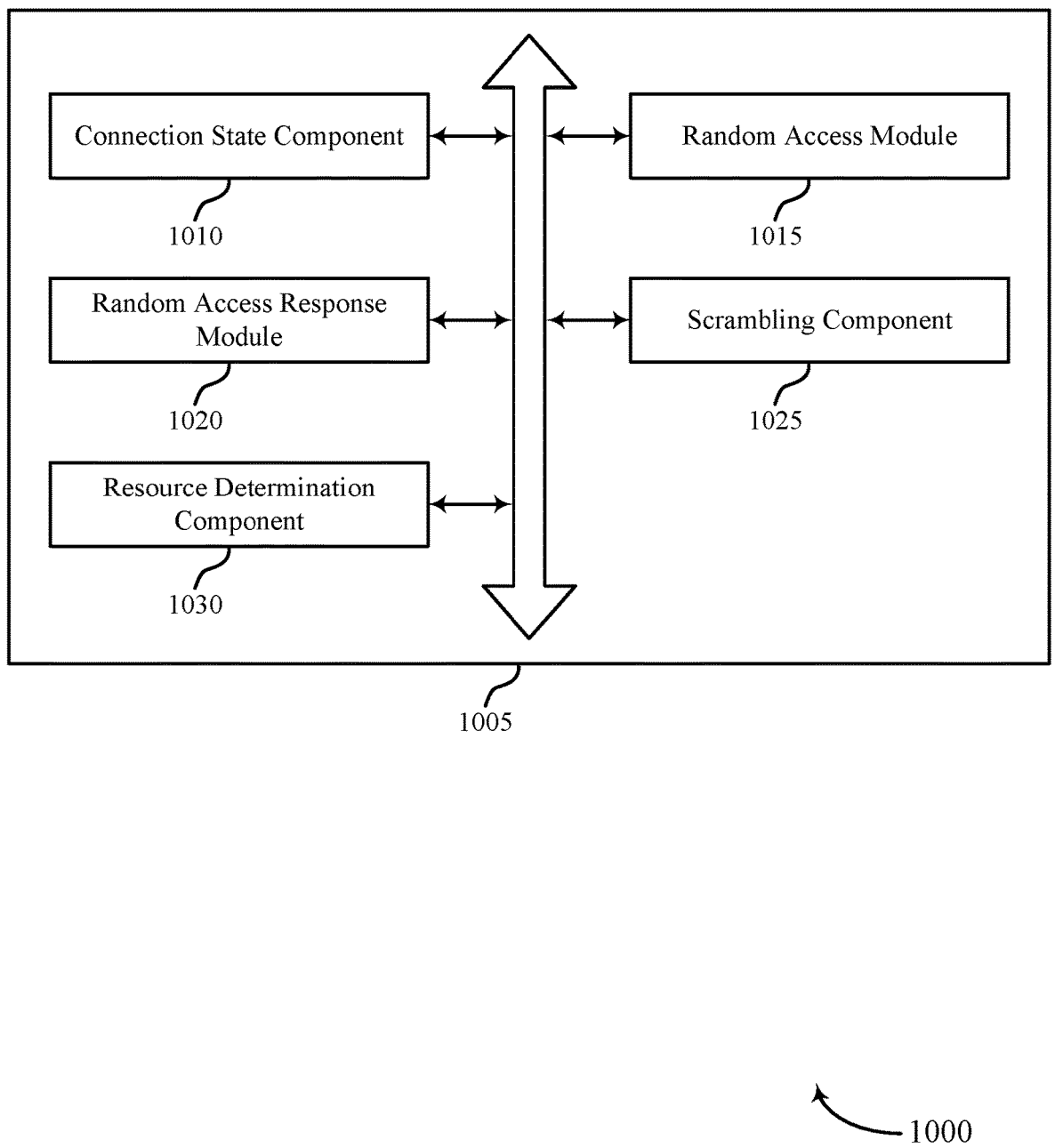
FIG. 10 shows a block diagram of a communications manager that supports message configuration for two-step random access procedure in accordance with aspects of the present disclosure.

FIG. 10 shows a block diagram 1000 of a communications manager 1005 that supports message configuration for two-step random access procedure in accordance with aspects of the present disclosure. The communications manager 1005 may be an example of aspects of a communications manager 815, a communications manager 915, or a communications manager 1110 described herein. The communications manager 1005 may include a connection state component 1010, a random access module 1015, a random access response module 1020, a scrambling component 1025, and a resource determination component 1030. Each of these modules may communicate, directly or indirectly, with one another (e.g., via one or more buses).

The connection state component 1010 may transmit, to a UE, configuration information for a first message of a two-step random access procedure between the UE and the base station, the configuration information including a connection-state dependent element indicating that the configuration information corresponds to a connection-state of the UE.

In some examples, the connection state component 1010 may transmit the configuration information for the first message via a first signal. In some examples, the connection state component 1010 may transmit a second signal different from the first signal, the second signal including second configuration information for the first message of the two-step random access procedure, where the second configuration information includes a second connection-state dependent element indicating that the second configuration information corresponds to a second connection-state of the UE different from the connection-state of the UE. In some cases, the connection state component 1010 may transmit the configuration information via an SSB, a SIB, a paging message, an RRC message, or any combination thereof.

In some instances, the second configuration information corresponds to multiple connection-states of the UE, and the second configuration information is different from the first configuration information for TBS, MCS, DMRS resource, preamble resource, PUSCH resource, preamble to PRU mapping, SSB to preamble RO or PO association, or any combination thereof. In some aspects, the current connection-state of the UE as one of an RRC idle mode, an RRC inactive mode, or an RRC connected mode. In some cases, the configuration information includes preamble resource information, PUSCH resource information, TBS, MCS, waveform, DMRS resource information, a mapping of a preamble to a PRU, an association between an SSB and RO or PO, or any combination thereof.

The random access module 1015 may receive, from the UE and based on a current connection-state of the UE being the connection-state of the UE to which the configuration information corresponds, the first message of the two-step random access procedure.

The random access response module 1020 may transmit a second message of the two-step random access procedure to the UE in response to the first message.

The scrambling component 1025 may scramble the configuration information based on a connection-state specific RNTI, where the connection-state specific RNTI is associated with one of an RRC idle mode, an RRC inactive mode, or an RRC connected mode. In some examples, the scrambling component 1025 may scramble second configuration information for the first message of the two-step random access procedure based on a second connection-state specific RNTI different from the connection-state specific RNTI, where the second configuration information includes a second connection-state dependent element indicating that the second configuration information corresponds to a second connection-state of the UE different from the connection-state of the UE. In some examples, the scrambling component 1025 may scramble the configuration information based on a group specific RNTI, where the group specific RNTI is associated with both an RRC idle mode and an RRC inactive mode. In some cases, the scrambling component 1025 may scramble the configuration information based on a group specific RNTI, where the group specific RNTI is associated with both an RRC inactive mode and an RRC connected mode.

The resource determination component 1030 may determine preamble resources for the first configuration information or second configuration information. In some cases, a preamble resource of the first configuration information overlaps a preamble resource of a second configuration information, where the second configuration information includes a second connection-state dependent element indicating that the second configuration information corresponds to a second connection-state of the UE different from the current connection-state of the UE.

In some cases, one or multiple values of the first configuration information overlaps with one or multiple values of a second configuration information for TBS, MCS, DMRS resource, preamble resource, PUSCH resource, preamble to PRU mapping, SSB to RO or PO association, or any combination thereof, and where the second configuration information includes a second connection-state dependent element indicating that the second configuration information corresponds to a second connection-state of the UE different from the current connection-state of the UE.

Figure 11:
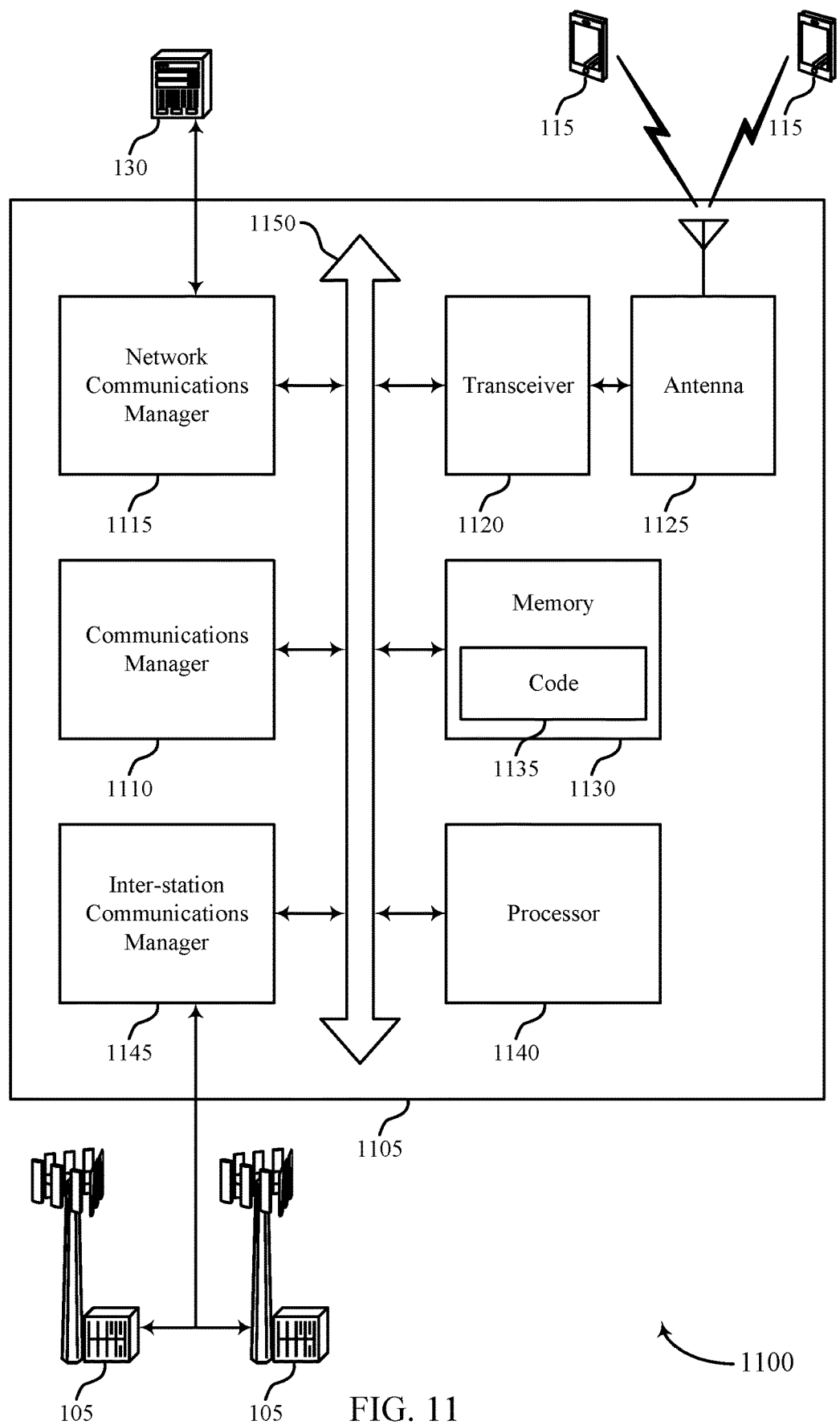
FIG. 11 shows a diagram of a system including a device that supports message configuration for two-step random access procedure in accordance with aspects of the present disclosure.

FIG. 11 shows a diagram of a system 1100 including a device 1105 that supports message configuration for two-step random access procedure in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, configuration information for a first message of a two-step random access procedure between the UE and the base station, the configuration information including a connection-state dependent element indicating that the configuration information corresponds to a connection-state of the UE, receive, from the UE and based on a current connection-state of the UE being the connection-state of the UE to which the configuration information corresponds, the first message of the two-step random access procedure, and transmit a second message of the two-step random access procedure to the UE in response to the first message.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting message configuration for two-step random access procedure).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
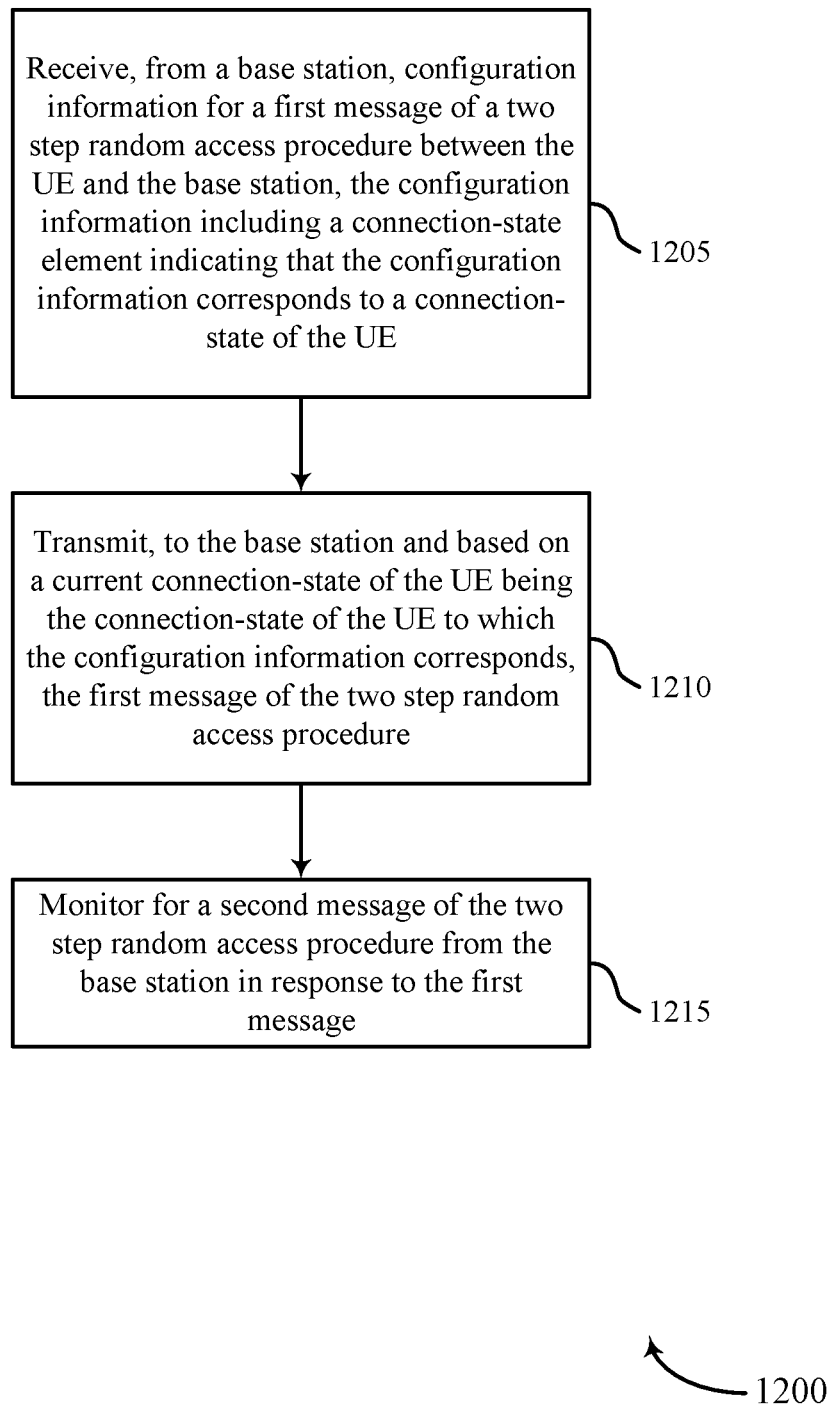
FIGS. 12 through 15 show flowcharts illustrating methods that support message configuration for two-step random access procedure in accordance with aspects of the present disclosure.

FIG. 12 shows a flowchart illustrating a method 1200 that supports message configuration for two-step random access procedure in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may receive, from a base station, configuration information for a first message of a two-step random access procedure between the UE and the base station, the configuration information including a connection-state dependent element indicating that the configuration information corresponds to a connection-state of the UE. The operations of 1205 may be performed according to the methods described herein. In some examples, aspects of the operations of 1205 may be performed by a configuration component as described with reference to FIGS. 4 through 7.

At 1210, the UE may transmit, to the base station and based on a current connection-state of the UE being the connection-state of the UE to which the configuration information corresponds, the first message of the two-step random access procedure. The operations of 1210 may be performed according to the methods described herein. In some examples, aspects of the operations of 1210 may be performed by a random access component as described with reference to FIGS. 4 through 7.

At 1215, the UE may monitor for a second message of the two-step random access procedure from the base station in response to the first message. The operations of 1215 may be performed according to the methods described herein. In some examples, aspects of the operations of 1215 may be performed by a random access response component as described with reference to FIGS. 4 through 7.

Figure 13:
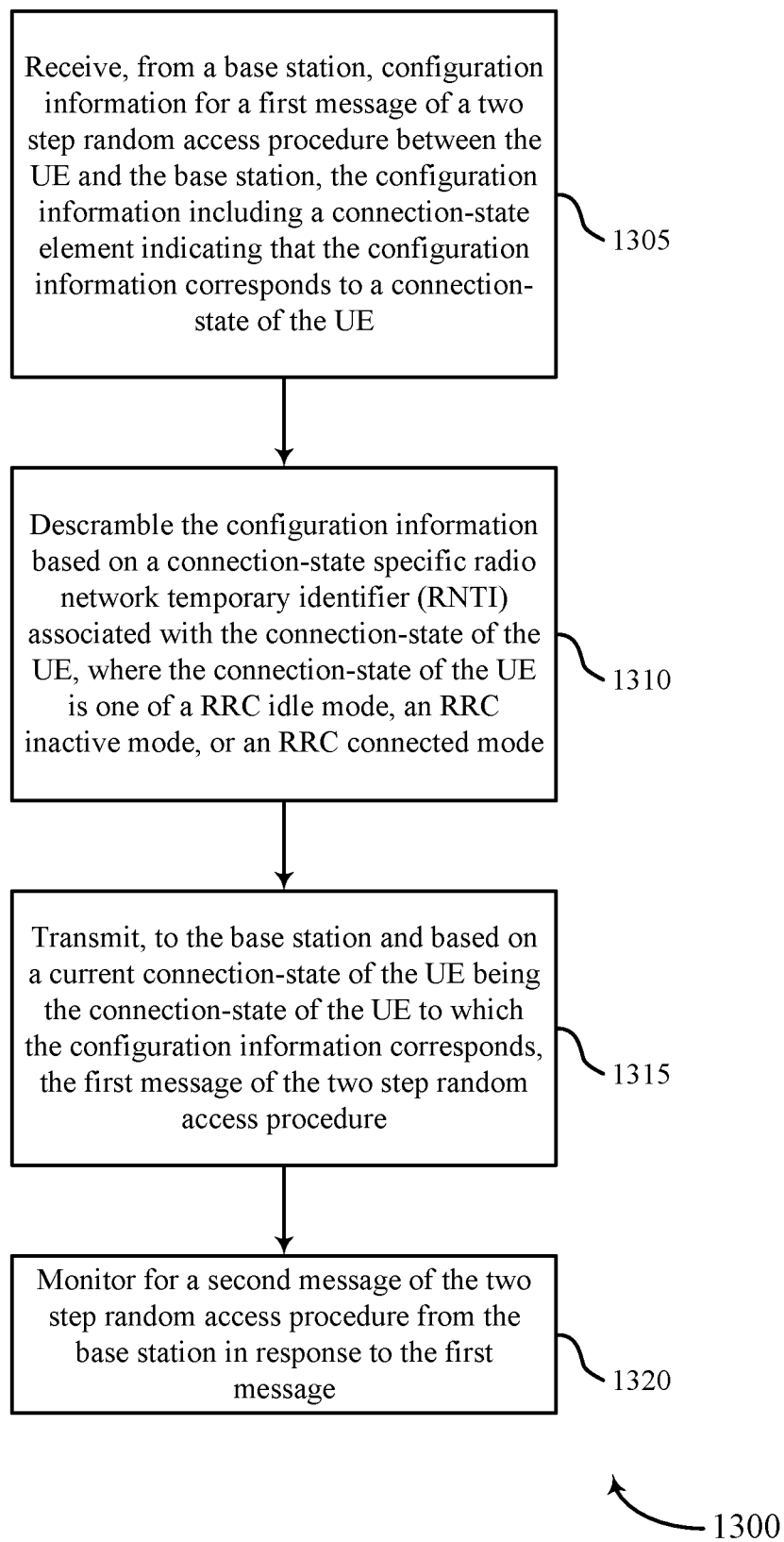

FIG. 13 shows a flowchart illustrating a method 1300 that supports message configuration for two-step random access procedure in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1305, the UE may receive, from a base station, configuration information for a first message of a two-step random access procedure between the UE and the base station, the configuration information including a connection-state dependent element indicating that the configuration information corresponds to a connection-state of the UE. The operations of 1305 may be performed according to the methods described herein. In some examples, aspects of the operations of 1305 may be performed by a configuration component as described with reference to FIGS. 4 through 7.

At 1310, the UE may descramble the configuration information based on a connection-state specific RNTI associated with the connection-state of the UE, where the connection-state of the UE is one of an RRC idle mode, an RRC inactive mode, or an RRC connected mode. The operations of 1310 may be performed according to the methods described herein. In some examples, aspects of the operations of 1310 may be performed by a descrambling component as described with reference to FIGS. 4 through 7.

At 1315, the UE may transmit, to the base station and based on a current connection-state of the UE being the connection-state of the UE to which the configuration information corresponds, the first message of the two-step random access procedure. The operations of 1315 may be performed according to the methods described herein. In some examples, aspects of the operations of 1315 may be performed by a random access component as described with reference to FIGS. 4 through 7.

At 1320, the UE may monitor for a second message of the two-step random access procedure from the base station in response to the first message. The operations of 1320 may be performed according to the methods described herein. In some examples, aspects of the operations of 1320 may be performed by a random access response component as described with reference to FIGS. 4 through 7.

Figure 14:
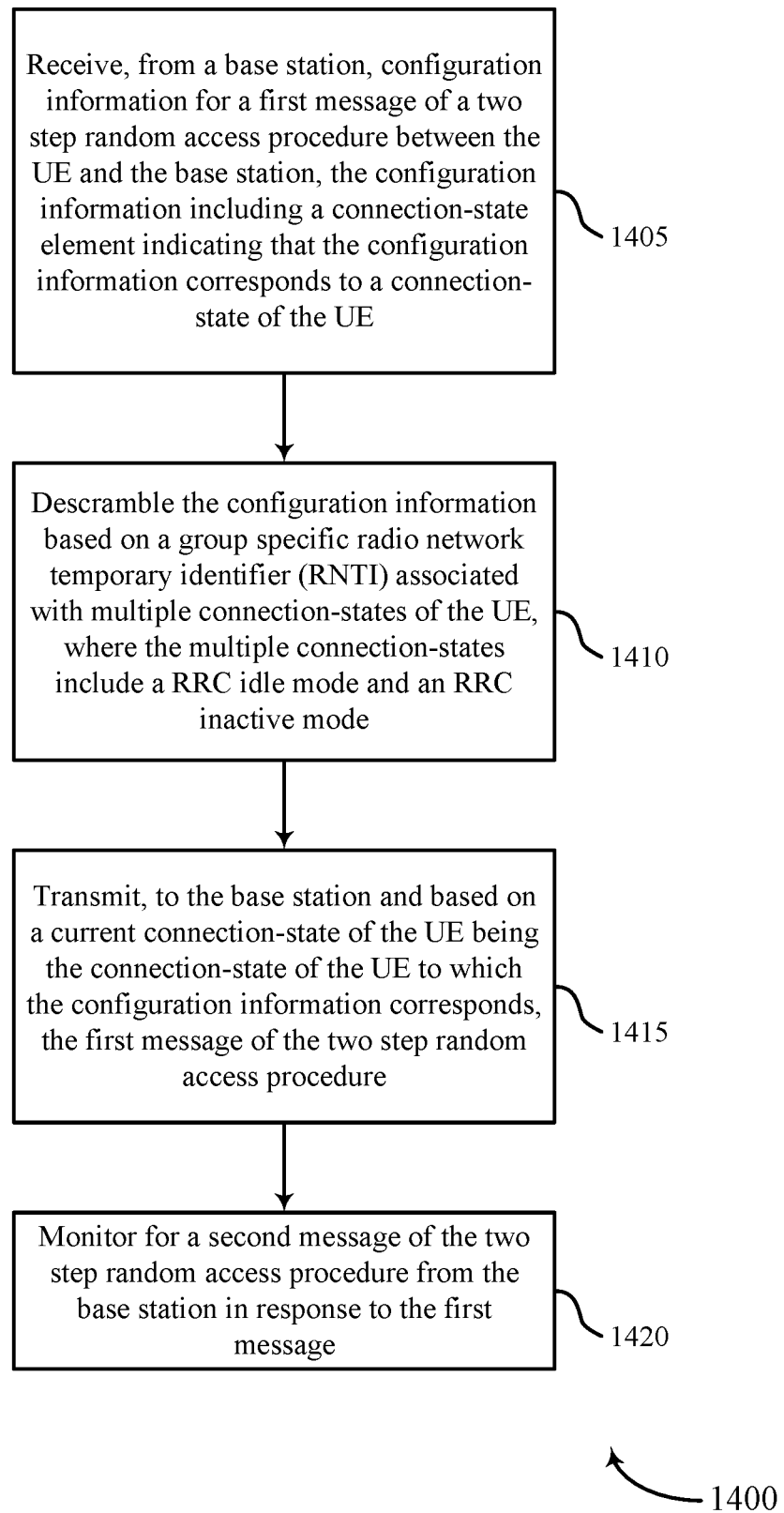

FIG. 14 shows a flowchart illustrating a method 1400 that supports message configuration for two-step random access procedure in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1405, the UE may receive, from a base station, configuration information for a first message of a two-step random access procedure between the UE and the base station, the configuration information including a connection-state dependent element indicating that the configuration information corresponds to a connection-state of the UE. The operations of 1405 may be performed according to the methods described herein. In some examples, aspects of the operations of 1405 may be performed by a configuration component as described with reference to FIGS. 4 through 7.

At 1410, the UE may descramble the configuration information based on a group specific RNTI associated with multiple connection-states of the UE, where the multiple connection-states include an RRC idle mode and an RRC inactive mode. The operations of 1410 may be performed according to the methods described herein. In some examples, aspects of the operations of 1410 may be performed by a descrambling component as described with reference to FIGS. 4 through 7.

At 1415, the UE may transmit, to the base station and based on a current connection-state of the UE being the connection-state of the UE to which the configuration information corresponds, the first message of the two-step random access procedure. The operations of 1415 may be performed according to the methods described herein. In some examples, aspects of the operations of 1415 may be performed by a random access component as described with reference to FIGS. 4 through 7.

At 1420, the UE may monitor for a second message of the two-step random access procedure from the base station in response to the first message. The operations of 1420 may be performed according to the methods described herein. In some examples, aspects of the operations of 1420 may be performed by a random access response component as described with reference to FIGS. 4 through 7.

Figure 15:
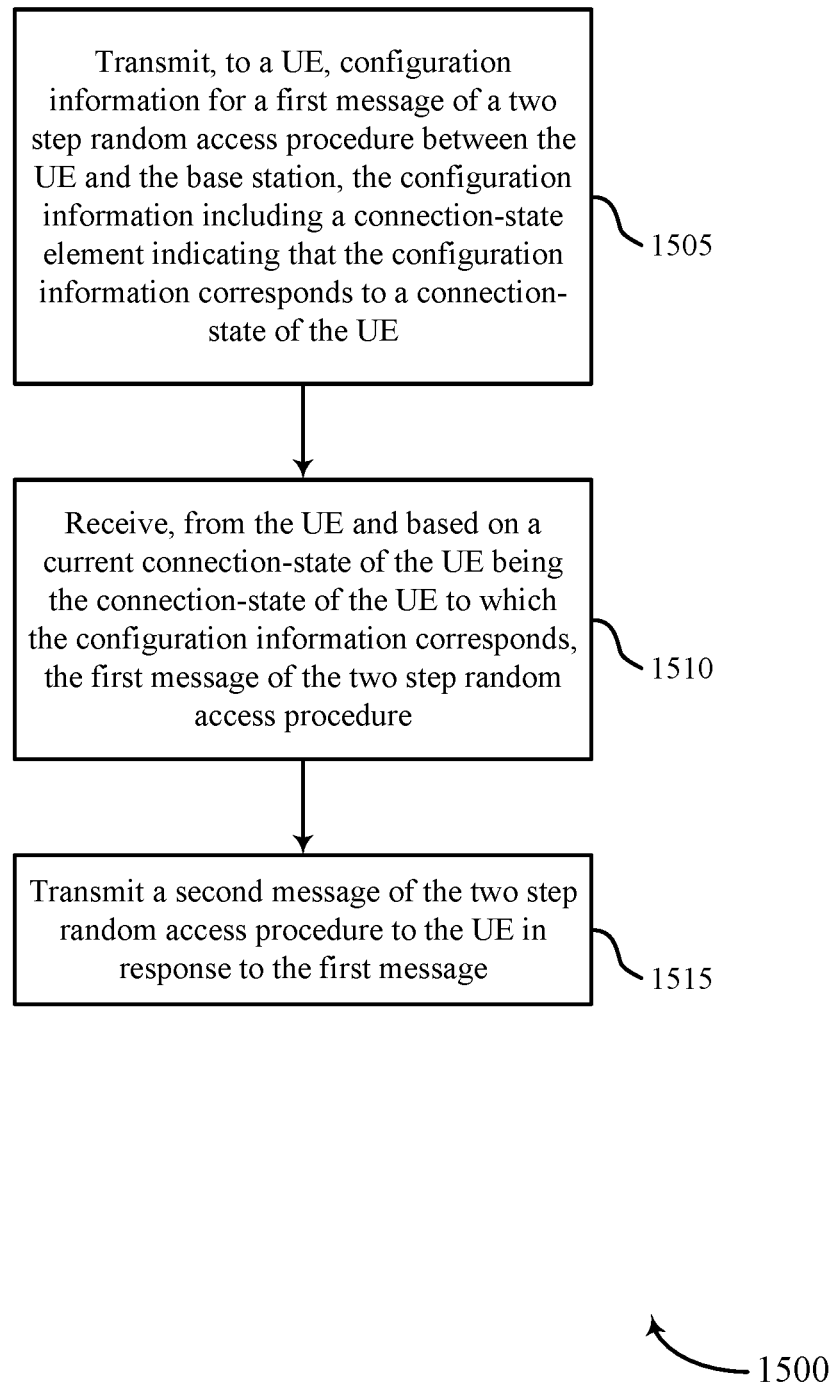

FIG. 15 shows a flowchart illustrating a method 1500 that supports message configuration for two-step random access procedure in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1505, the base station may transmit, to a UE, configuration information for a first message of a two-step random access procedure between the UE and the base station, the configuration information including a connection-state dependent element indicating that the configuration information corresponds to a connection-state of the UE. The operations of 1505 may be performed according to the methods described herein. In some examples, aspects of the operations of 1505 may be performed by a connection state component as described with reference to FIGS. 8 through 11.

At 1510, the base station may receive, from the UE and based on a current connection-state of the UE being the connection-state of the UE to which the configuration information corresponds, the first message of the two-step random access procedure. The operations of 1510 may be performed according to the methods described herein. In some examples, aspects of the operations of 1510 may be performed by a random access module as described with reference to FIGS. 8 through 11.

At 1515, the base station may transmit a second message of the two-step random access procedure to the UE in response to the first message. The operations of 1515 may be performed according to the methods described herein. In some examples, aspects of the operations of 1515 may be performed by a random access response module as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method for wireless communications at a user equipment (UE), comprising: receiving, from a base station, configuration information for a first message of a two-step random access procedure between the UE and the base station, the configuration information comprising a connection-state element indicating that the configuration information corresponds to a connection-state of the UE; transmitting, to the base station and based at least in part on a current connection-state of the UE being the connection-state of the UE to which the configuration information corresponds, the first message of the two-step random access procedure; and monitoring for a second message of the two-step random access procedure from the base station in response to the first message.

Example 2: The method of example 1, wherein receiving the configuration information comprises: descrambling the configuration information based at least in part on a connection-state specific radio network temporary identifier (RNTI) associated with the connection-state of the UE, wherein the connection-state of the UE is one of a radio resource control (RRC) idle mode, an RRC inactive mode, or an RRC connected mode.

Example 3: The method of example 2, further comprising: receiving second configuration information for the first message of the two-step random access procedure, wherein the second configuration information comprises a second connection-state element indicating that the second configuration information corresponds to a second connection-state of the UE different from the current connection-state of the UE; and descrambling the second configuration information based at least in part on a second connection-state specific RNTI associated with the second connection-state of the UE.

Example 4: The method of any of examples 1 to 3, further comprising: descrambling the configuration information based at least in part on a group specific radio network temporary identifier (RNTI) associated with multiple connection-states of the UE, wherein the multiple connection-states include a radio resource control (RRC) idle mode and an RRC inactive mode.

Example 5: The method of example 4, further comprising: receiving second configuration information for the first message of the two-step random access procedure, wherein the second configuration information comprises a second connection-state element indicating that the second configuration information corresponds to a second connection-state of the UE different from the connection-state of the UE; and descrambling the second configuration information based at least in part on a second group specific RNTI associated with the second connection-state of the UE.

Example 6: The method of any of examples 1 to 5, wherein the configuration information comprises preamble resource information, physical uplink shared channel (PUSCH) resource information, transport block size (TBS), modulation and coding scheme (MCS), waveform, demodulation reference signal (DMRS) resource information, a mapping of a preamble to a PUSCH resource unit (PRU), an association between a synchronization signal block (SSB) and preamble occasion (RO) or PUSCH occasion (PO), or any combination thereof.

Example 7: The method of any of examples 1 to 6, further comprising: descrambling the configuration information based at least in part on a group specific radio network temporary identifier (RNTI) associated with multiple connection-states of the UE, wherein the multiple connection-states include a radio resource control (RRC) inactive mode and an RRC connected mode.

Example 8: The method of example 7, further comprising: receiving second configuration information for the first message of the two-step random access procedure, wherein the second configuration information comprises a second connection-state element indicating that the second configuration information corresponds to a second connection-state of the UE different from the current connection-state of the UE; descrambling the second configuration information based at least in part on a second group specific RNTI associated with the second connection-state of the UE; selecting a value for a preamble resource, physical uplink shared channel (PUSCH) resource, transport block size (TBS), modulation and coding scheme (MCS), waveform, demodulation reference signal (DMRS) resource, a preamble to a PUSCH resource unit (PRU) mapping, an synchronization signal block (SSB) to preamble occasion (RO) or PUSCH occasion (PO) association, from a union of the first and the second configuration information, from the second configuration information only, or from the first configuration information only; and applying the selected value to the first message of the two-step random access procedure for transmitting the first message to the base station.

Example 9: The method of example 8, further comprising: transmitting the first message of the two-step random access procedure according to at least a portion of the second configuration information.

Example 10: The method of any of examples 1 to 9, further comprising: receiving the configuration information for the first message via a first signal; and receiving a second signal different from the first signal, the second signal comprising second configuration information for the first message of the two-step random access procedure, wherein the second configuration information comprises a second connection-state element indicating that the second configuration information corresponds to a second connection-state of the UE different from the current connection-state of the UE.

Example 11: The method of example 10, wherein the second configuration information corresponds to multiple connection-states of the UE, each of which is different from the current connection-state of the UE.

Example 12: The method of any of examples 1 to 11, further comprising: receiving second configuration information for the first message of the two-step random access procedure, wherein the second configuration information comprises a second connection-state element indicating that the second configuration information corresponds to a second connection-state of the UE different from the current connection-state of the UE; and transmitting the first message of the two-step random access procedure according to at least a portion of the second configuration information.

Example 13: The method of example 12, wherein preamble resource information of the first configuration information at least partially overlaps preamble resource information of the second configuration information, or physical uplink shared channel (PUSCH) resource information of the first configuration information at least partially overlaps PUSCH resource information of the second configuration information, or demodulation reference signal (DMRS) resource information of the first configuration information at least partially overlaps DMRS resource information of the second configuration information, or transport block size (TBS) information of the first configuration information at least partially overlaps TBS information of the second configuration information, modulation and coding scheme (MCS) information of the first configuration information at least partially overlaps MCS information of the second configuration information, or a mapping relation between preamble and PUSCH resource unit (PRU) of the first configuration information at least partially overlaps the mapping relation between preamble and PRU of the second configuration information, or an association pattern between synchronization signal block (SSB) and preamble resource occasion (RO) or PUSCH occasion (PO) of the first configuration information at least partially overlaps the association pattern between SSB and preamble RO or PUSCH PO of the second configuration information.

Example 14: The method of example 12, further comprising: receiving the second configuration information in a signal different from the first configuration information while UE is in the current connected state; decoding both the second configuration information and the first configuration information; and transmitting, by the UE in the current connected-state, the first message based at least in part on only one of the first configuration information or the second configuration information.

Example 15: The method of example 12, further comprising: failing to decode the first configuration information while the UE is in the current connected-state; and transmitting, by the UE in the current connected-state, the first message based at least in part on the second configuration information corresponding to the second connection-state of the UE.

Example 16: The method of any of examples 1 to 15, further comprising: receiving system information that indicates second configuration information for the first message of the two-step random access procedure, wherein the second configuration information comprises a second connection-state element indicating that the second configuration information corresponds to a second connection-state of the UE different from the connection-state of the UE; receiving radio resource control (RRC) signaling that comprises the configuration information corresponding to the second connection-state of the UE; and transmitting the first message of the two-step random access procedure according to the configuration information independent of the system information.

Example 17: The method of any of examples 1 to 16, further comprising: determining the current connection-state of the UE as one of a radio resource control (RRC) idle mode, an RRC inactive mode, or an RRC connected mode.

Example 18: The method of any of examples 1 to 17, further comprising: receiving the configuration information via a synchronization signal block (SSB), a system information block (SIB), a paging message, a radio resource control (RRC) message, or any combination thereof.

Example 19: A method for wireless communications at a base station, comprising: transmitting, to a user equipment (UE), configuration information for a first message of a two-step random access procedure between the UE and the base station, the configuration information comprising a connection-state element indicating that the configuration information corresponds to a connection-state of the UE; receiving, from the UE and based at least in part on a current connection-state of the UE being the connection-state of the UE to which the configuration information corresponds, the first message of the two-step random access procedure; and transmitting a second message of the two-step random access procedure to the UE in response to the first message.

Example 20: The method of example 19, further comprising: scrambling the configuration information based at least in part on a connection-state specific radio network temporary identifier (RNTI), wherein the connection-state specific RNTI is associated with one of a radio resource control (RRC) idle mode, an RRC inactive mode, or an RRC connected mode; and scrambling second configuration information for the first message of the two-step random access procedure based at least in part on a second connection-state specific RNTI different from the connection-state specific RNTI, wherein the second configuration information comprises a second connection-state element indicating that the second configuration information corresponds to a second connection-state of the UE different from the connection-state of the UE.

Example 21: The method of any of examples 19 to 20, further comprising: scrambling the configuration information based at least in part on a group specific radio network temporary identifier (RNTI), wherein the group specific RNTI is associated with both a radio resource control (RRC) idle mode and an RRC inactive mode.

Example 22: The method of any of examples 19 to 21, further comprising: scrambling the configuration information based at least in part on a group specific radio network temporary identifier (RNTI), wherein the group specific RNTI is associated with both a radio resource control (RRC) inactive mode and an RRC connected mode.

Example 23: The method of any of examples 19 to 22, further comprising: transmitting the configuration information for the first message via a first signal; and transmitting a second signal different from the first signal, the second signal comprising second configuration information for the first message of the two-step random access procedure, wherein the second configuration information comprises a second connection-state element indicating that the second configuration information corresponds to a second connection-state of the UE different from the connection-state of the UE.

Example 24: The method of example 23, wherein the second configuration information corresponds to multiple connection-states of the UE, and the second configuration information is different from the first configuration information for transport block size (TBS), modulation and coding scheme (MCS), demodulation reference signal (DMRS) resource, preamble resource, physical uplink shared channel (PUSCH) resource, preamble to PUSCH resource unit (PRU) mapping, synchronization signal block (SSB) to preamble resource occasion (RO) or PUSCH occasion (PO) association, or any combination thereof.

Example 25: The method of any of examples 19 to 24, wherein a preamble resource of the first configuration information overlaps a preamble resource of a second configuration information, wherein the second configuration information comprises a second connection-state element indicating that the second configuration information corresponds to a second connection-state of the UE different from the current connection-state of the UE.

Example 26: The method of any of examples 19 to 25, wherein one or multiple values of the first configuration information overlaps with one or multiple values of a second configuration information for transport block size (TBS), modulation and coding scheme (MCS), demodulation reference signal (DMRS) resource, preamble resource, physical uplink shared channel (PUSCH) resource, preamble to PUSCH resource unit (PRU) mapping, synchronization signal block (SSB) to preamble resource occasion (RO) or PUSCH occasion (PO) association, or any combination thereof, and wherein the second configuration information comprises a second connection-state element indicating that the second configuration information corresponds to a second connection-state of the UE different from the current connection-state of the UE.

Example 27: The method of any of examples 19 to 26, wherein the current connection-state of the UE as one of a radio resource control (RRC) idle mode, an RRC inactive mode, or an RRC connected mode.

Example 28: The method of any of examples 19 to 27, further comprising: transmitting the configuration information via a synchronization signal block (SSB), a system information block (SIB), a paging message, a radio resource control (RRC) message, or any combination thereof.

Example 29. The method of any of examples 19 to 28, wherein the configuration information comprises preamble resource information, physical uplink shared channel (PUSCH) resource information, transport block size (TBS), modulation and coding scheme (MCS), waveform, demodulation reference signal (DMRS) resource information, a mapping of a preamble to a PUSCH resource unit (PRU), an association between a synchronization signal block (SSB) and preamble occasion (RO) or PUSCH occasion (PO), or any combination thereof.

Example 30: An apparatus comprising at least one means for performing a method of any of examples 1 to 18.

Example 31: An apparatus comprising at least one means for performing a method of any of examples 19 to 29.

Example 32: An apparatus for wireless communications comprising a processor; memory in electronic communication with the processor; and instructions stored in the memory and executable by the processor to cause the apparatus to perform a method of any of examples 1 to 18.

Example 33: An apparatus for wireless communications comprising a processor; memory in electronic communication with the processor; and instructions stored in the memory and executable by the processor to cause the apparatus to perform a method of any of examples 19 to 29.

Example 34: A non-transitory computer-readable medium storing code for wireless communications, the code comprising instructions executable by a processor to perform a method of any of examples 1 to 18.

Example 35: A non-transitory computer-readable medium storing code for wireless communications, the code comprising instructions executable by the processor to perform a method of any of examples 19 to 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from an access network entity, configuration information for a first message of a two-step random access procedure between the UE and access network entity, the configuration information comprising a connection-state dependent element indicating that the configuration information corresponds to a connection-state of the UE;
   receiving second configuration information for the first message of the two-step random access procedure, wherein the second configuration information comprises a second connection-state dependent element indicating that the second configuration information corresponds to a second connection-state of the UE different from a current connection-state of the UE;
   transmitting, to the access network entity and based at least in part on the current connection-state of the UE being the connection-state of the UE to which the configuration information corresponds, the first message of the two-step random access procedure according to at least a portion of the second configuration information; and
   monitoring for a second message of the two-step random access procedure from the access network entity in response to the first message.

2. The method of claim 1, wherein preamble resource information of the first configuration information at least partially overlaps preamble resource information of the second configuration information, or physical uplink shared channel (PUSCH) resource information of the first configuration information at least partially overlaps PUSCH resource information of the second configuration information, or demodulation reference signal (DMRS) resource information of the first configuration information at least partially overlaps DMRS resource information of the second configuration information, or transport block size (TBS) information of the first configuration information at least partially overlaps TBS information of the second configuration information, modulation and coding scheme (MCS) information of the first configuration information at least partially overlaps MCS information of the second configuration information, or a mapping relation between preamble and PUSCH resource unit (PRU) of the first configuration information at least partially overlaps the mapping relation between preamble and PRU of the second configuration information, or an association pattern between synchronization signal block (SSB) and preamble resource occasion (RO) or PUSCH occasion (PO) of the first configuration information at least partially overlaps the association pattern between SSB and preamble RO or PUSCH PO of the second configuration information.

3. The method of claim 1, further comprising:
   receiving the second configuration information in a signal different from the first configuration information while UE is in the current connected state;
   decoding both the second configuration information and the first configuration information; and
   transmitting, by the UE in the current connected-state, the first message based at least in part on only one of the first configuration information or the second configuration information.

4. The method of claim 1, further comprising:
   failing to decode the first configuration information while the UE is in the current connected-state; and
   transmitting, by the UE in the current connected-state, the first message based at least in part on the second configuration information corresponding to the second connection-state of the UE.

5. The method of claim 1, wherein receiving the configuration information comprises:
   descrambling the configuration information based at least in part on a connection-state specific radio network temporary identifier (RNTI) associated with the connection-state of the UE, wherein the connection-state of the UE is one of a radio resource control (RRC) idle mode, an RRC inactive mode, or an RRC connected mode.

6. The method of claim 2, further comprising:
   descrambling the second configuration information based at least in part on a second connection-state specific RNTI associated with the second connection-state of the UE.

7. The method of claim 1, further comprising:
   descrambling the configuration information based at least in part on a group specific radio network temporary identifier (RNTI) associated with multiple connection-states of the UE, wherein the multiple connection-states include a radio resource control (RRC) idle mode and an RRC inactive mode.

8. The method of claim 4, further comprising:
   descrambling the second configuration information based at least in part on a second group specific RNTI associated with the second connection-state of the UE.

9. The method of claim 1, wherein the configuration information comprises preamble resource information, physical uplink shared channel (PUSCH) resource information, transport block size (TBS), modulation and coding scheme (MCS), waveform, demodulation reference signal (DMRS) resource information, a mapping of a preamble to a PUSCH resource unit (PRU), an association between a synchronization signal block (SSB) and preamble occasion (RO) or PUSCH occasion (PO), or any combination thereof.

10. The method of claim 1, further comprising:
descrambling the configuration information based at least in part on a group specific radio network temporary identifier (RNTI) associated with multiple connection-states of the UE, wherein the multiple connection-states include a radio resource control (RRC) inactive mode and an RRC connected mode.

11. The method of claim 10, further comprising:
descrambling the second configuration information based at least in part on a second group specific RNTI associated with the second connection-state of the UE;
selecting a value for a preamble resource, physical uplink shared channel (PUSCH) resource, transport block size (TBS), modulation and coding scheme (MCS), waveform, demodulation reference signal (DMRS) resource, a preamble to a PUSCH resource unit (PRU) mapping, an synchronization signal block (SSB) to preamble occasion (RO) or PUSCH occasion (PO) association, from a union of the first and the second configuration information, from the second configuration information only, or from the first configuration information only; and
applying the selected value to the first message of the two-step random access procedure for transmitting the first message to the access network entity.

12. The method of claim 1, further comprising:
receiving system information that indicates the second configuration information for the first message of the two-step random access procedure;
receiving radio resource control (RRC) signaling that comprises the configuration information corresponding to the second connection-state of the UE; and
transmitting the first message of the two-step random access procedure according to the configuration information independent of the system information.

13. The method of claim 1, further comprising:
determining the current connection-state of the UE as one of a radio resource control (RRC) idle mode, an RRC inactive mode, or an RRC connected mode.

14. The method of claim 1, further comprising:
receiving the configuration information via a synchronization signal block (SSB), a system information block (SIB), a paging message, a radio resource control (RRC) message, or any combination thereof.

15. A method for wireless communications at an access network entity, comprising:
transmitting, to a user equipment (UE), configuration information for a first message of a two-step random access procedure between the UE and the access network entity, the configuration information comprising a connection-state dependent element indicating that the configuration information corresponds to a connection-state of the UE;
transmitting second configuration information for the first message of the two-step random access procedure, wherein the second configuration information comprises a second connection-state dependent element indicating that the second configuration information corresponds to a second connection-state of the UE different from a current connection-state of the UE;
receiving, from the UE and based at least in part on the current connection-state of the UE being the connection-state of the UE to which the configuration information corresponds, the first message of the two-step random access procedure according to at least a portion of the second configuration information; and
transmitting a second message of the two-step random access procedure to the UE in response to the first message.

16. The method of claim 15, wherein a preamble resource of the first configuration information overlaps a preamble resource of a second configuration information.

17. The method of claim 15, wherein one or multiple values of the first configuration information overlaps with one or multiple values of a second configuration information for transport block size (TBS), modulation and coding scheme (MCS), demodulation reference signal (DMRS) resource, preamble resource, physical uplink shared channel (PUSCH) resource, preamble to PUSCH resource unit (PRU) mapping, synchronization signal block (SSB) to preamble resource occasion (RO) or PUSCH occasion (PO) association, or any combination thereof.

18. The method of claim 15, further comprising:
scrambling the configuration information based at least in part on a connection-state specific radio network temporary identifier (RNTI), wherein the connection-state specific RNTI is associated with one of a radio resource control (RRC) idle mode, an RRC inactive mode, or an RRC connected mode; and
scrambling second configuration information for the first message of the two-step random access procedure based at least in part on a second connection-state specific RNTI different from the connection-state specific RNTI.

19. The method of claim 15, further comprising:
scrambling the configuration information based at least in part on a group specific radio network temporary identifier (RNTI), wherein the group specific RNTI is associated with both a radio resource control (RRC) idle mode and an RRC inactive mode.

20. The method of claim 15, further comprising:
scrambling the configuration information based at least in part on a group specific radio network temporary identifier (RNTI), wherein the group specific RNTI is associated with both a radio resource control (RRC) inactive mode and an RRC connected mode.

21. The method of claim 15, further comprising:
transmitting the configuration information via a synchronization signal block (SSB), a system information block (SIB), a paging message, a radio resource control (RRC) message, or any combination thereof.

22. The method of claim 15, wherein the configuration information comprises preamble resource information, physical uplink shared channel (PUSCH) resource information, transport block size (TBS), modulation and coding scheme (MCS), waveform, demodulation reference signal (DMRS) resource information, a mapping of a preamble to a PUSCH resource unit (PRU), an association between a synchronization signal block (SSB) and preamble occasion (RO) or PUSCH occasion (PO), or any combination thereof.

23. An apparatus for wireless communications at a user equipment (UE), comprising:
a processor,
memory coupled with the processor; and
instructions stored in the memory and executable by the processor to cause the apparatus to:
receive, from access network entity, configuration information for a first message of a two-step random access procedure between the UE and the access network entity, the configuration information comprising a connection-state dependent element indicating that the configuration information corresponds to a connection-state of the UE;
receive second configuration information for the first message of the two-step random access procedure, wherein the second configuration information comprises a second connection-state dependent element indicating that the second configuration information corresponds to a second connection-state of the UE different from a current connection-state of the UE;
transmit, to the access network entity and based at least in part on the current connection-state of the UE being the connection-state of the UE to which the configuration information corresponds, the first message of the two-step random access procedure according to at least a portion of the second configuration information; and
monitor for a second message of the two-step random access procedure from the access network entity in response to the first message.

24. An apparatus for wireless communications at an access network entity, comprising:
a processor,
memory coupled with the processor; and
instructions stored in the memory and executable by the processor to cause the apparatus to:
transmit, to a user equipment (UE), configuration information for a first message of a two-step random access procedure between the UE and the access network entity, the configuration information comprising a connection-state dependent element indicating that the configuration information corresponds to a connection-state of the UE;
transmit second configuration information for the first message of the two-step random access procedure, wherein the second configuration information comprises a second connection-state dependent element indicating that the second configuration information corresponds to a second connection-state of the UE different from a current connection-state of the UE;
receive, from the UE and based at least in part on the current connection-state of the UE being the connection-state of the UE to which the configuration information corresponds, the first message of the two-step random access procedure according to at least a portion of the second configuration information; and
transmit a second message of the two-step random access procedure to the UE in response to the first message.

25. The apparatus of claim 23, wherein preamble resource information of the first configuration information at least partially overlaps preamble resource information of the second configuration information, or physical uplink shared channel (PUSCH) resource information of the first configuration information at least partially overlaps PUSCH resource information of the second configuration information, or demodulation reference signal (DMRS) resource information of the first configuration information at least partially overlaps DMRS resource information of the second configuration information, or transport block size (TBS) information of the first configuration information at least partially overlaps TBS information of the second configuration information, modulation and coding scheme (MCS) information of the first configuration information at least partially overlaps MCS information of the second configuration information, or a mapping relation between preamble and PUSCH resource unit (PRU) of the first configuration information at least partially overlaps the mapping relation between preamble and PRU of the second configuration information, or an association pattern between synchronization signal block (SSB) and preamble resource occasion (RO) or PUSCH occasion (PO) of the first configuration information at least partially overlaps the association pattern between SSB and preamble RO or PUSCH PO of the second configuration information.

26. The apparatus of claim 23, wherein the instructions are further executable by the processor to cause the apparatus to:
receive the second configuration information in a signal different from the first configuration information while UE is in the current connected state;
decode both the second configuration information and the first configuration information; and
transmit, by the UE in the current connected-state, the first message based at least in part on only one of the first configuration information or the second configuration information.

27. The apparatus of claim 23, wherein the instructions are further executable by the processor to cause the apparatus to:
fail to decode the first configuration information while the UE is in the current connected-state; and
transmit, by the UE in the current connected-state, the first message based at least in part on the second configuration information corresponding to the second connection-state of the UE.

28. The apparatus of claim 24, wherein a preamble resource of the first configuration information overlaps a preamble resource of a second configuration information.

29. The apparatus of claim 24, wherein one or multiple values of the first configuration information overlaps with one or multiple values of a second configuration information for transport block size (TBS), modulation and coding scheme (MCS), demodulation reference signal (DMRS) resource, preamble resource, physical uplink shared channel (PUSCH) resource, preamble to PUSCH resource unit (PRU) mapping, synchronization signal block (SSB) to preamble resource occasion (RO) or PUSCH occasion (PO) association, or any combination thereof.

30. The apparatus of claim 24, wherein the instructions are further executable by the processor to cause the apparatus to:
scramble the configuration information based at least in part on a connection-state specific radio network temporary identifier (RNTI), wherein the connection-state specific RNTI is associated with one of a radio resource control (RRC) idle mode, an RRC inactive mode, or an RRC connected mode; and
scramble second configuration information for the first message of the two-step random access procedure based at least in part on a second connection-state specific RNTI different from the connection-state specific RNTI.

\* \* \* \* \*